United States Patent [19]

Lary

[11] Patent Number: 5,142,687
[45] Date of Patent: Aug. 25, 1992

[54] SORT ACCELERATOR WITH REBOUND SORTER REPEATEDLY MERGING SORTED STRINGS

[75] Inventor: Richard F. Lary, Colorado Springs, Colo.

[73] Assignee: Digital Equipment Corporation, Maynard, Mass.

[21] Appl. No.: 374,433

[22] Filed: Jun. 30, 1989

[51] Int. Cl.⁵ .......................... G06F 7/08; G06F 7/14
[52] U.S. Cl. ................................. 395/800; 364/222.9; 364/259.2; 364/262; 364/946.8; 364/947.2; 364/DIG. 1; 395/600
[58] Field of Search ... 364/200 MS File, 900 MS File; 395/250, 500, 600, 800

[56] References Cited

U.S. PATENT DOCUMENTS

| | | | |
|---|---|---|---|
| 3,587,057 | 6/1971 | Armstrong | 340/172.5 |
| 3,997,880 | 12/1976 | Chen et al. | 395/600 |
| 4,031,520 | 6/1977 | Rohner | 364/200 |
| 4,078,260 | 3/1978 | Chen et al. | 395/600 |
| 4,090,249 | 5/1978 | Chen et al. | 395/600 |
| 4,110,837 | 8/1978 | Chen | 364/900 |
| 4,210,961 | 7/1980 | Whitlow et al. | 364/300 |
| 4,303,989 | 12/1981 | Meurbrino et al. | 364/900 |
| 4,425,617 | 1/1984 | Sherwood | 364/200 |
| 4,464,732 | 8/1984 | Clark | 395/800 |
| 4,499,555 | 2/1985 | Huang | 364/900 |
| 4,514,826 | 4/1985 | Iwata et al. | 364/900 |
| 4,520,456 | 5/1985 | Miranker et al. | 395/800 |
| 4,604,726 | 8/1986 | Terzian | 364/900 |

OTHER PUBLICATIONS

"The Rebound Sorter: An efficient sort engine for large files," International Conference on Databases, 4th—Proceedings, West Berlin, Germany, 1978, pp. 312-318. IEEE Computer Society, Long Beach, Calif. Document #78 CH 1389-6 C.

Primary Examiner—Thomas C. Lee
Assistant Examiner—Ken S. Kim
Attorney, Agent, or Firm—Arnold, White & Durkee

[57] ABSTRACT

A sort accelerator is disclosed which uses a rebound sorter as a merger in which large numbers of records can be efficiently and rapidly sorted. The rebound sorter not only can sort a number of records but can be used to merge together previously sorted groups of records into larger sorted groups. A certain number of processing elements and record storage elements are used to simultaneously compare records. Depending on the sort chosen either a descending or ascending sort can be made.

The merging operation consists of an input phase, and a merge-up phase, an output phase, and a final merge phase. Successively larger strings of records are created until a final sorted string of records remains. Through various enhancements and associated circuitry the rebound sorter can sort and merge large numbers of records quickly and efficiently.

2 Claims, 10 Drawing Sheets

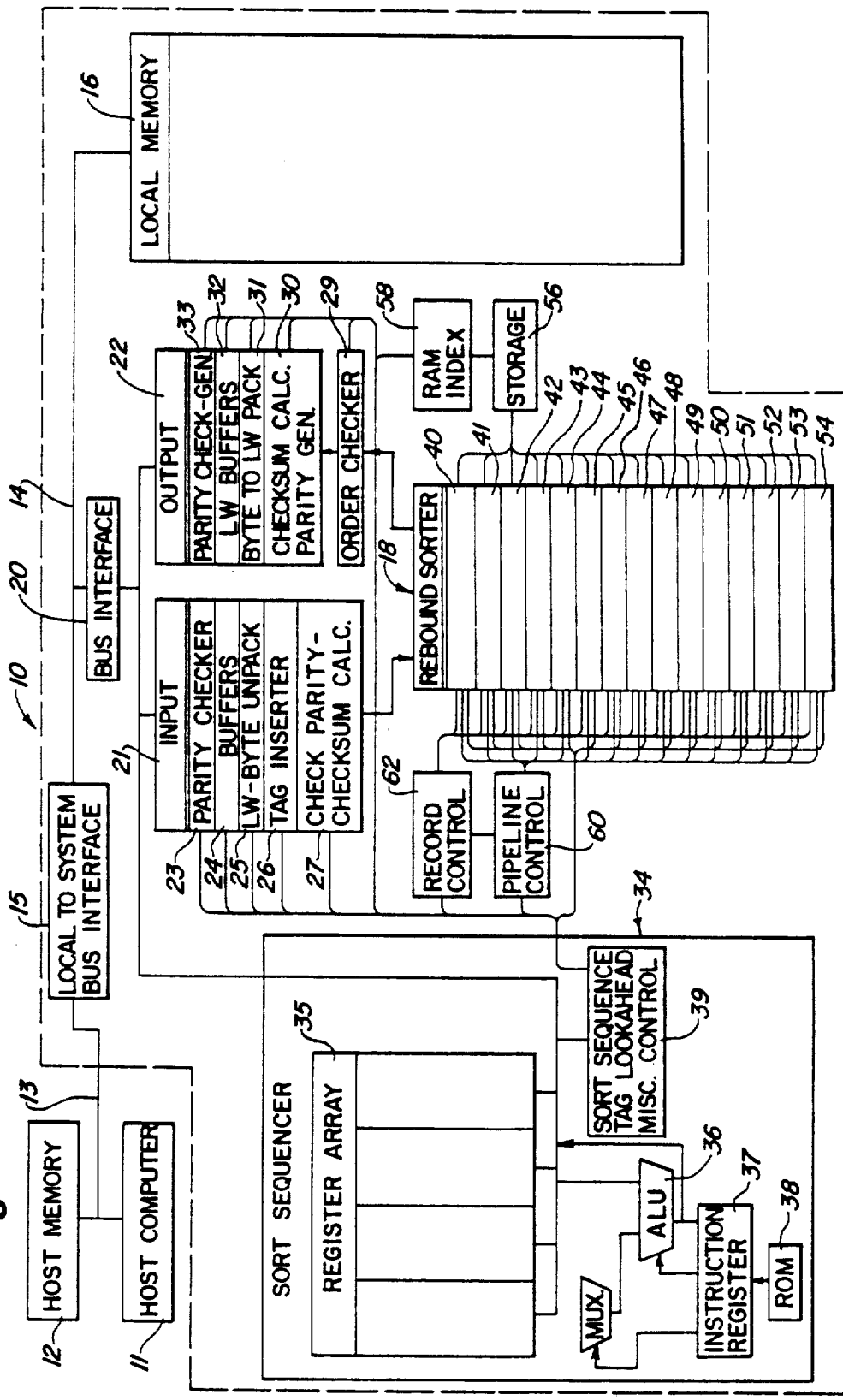

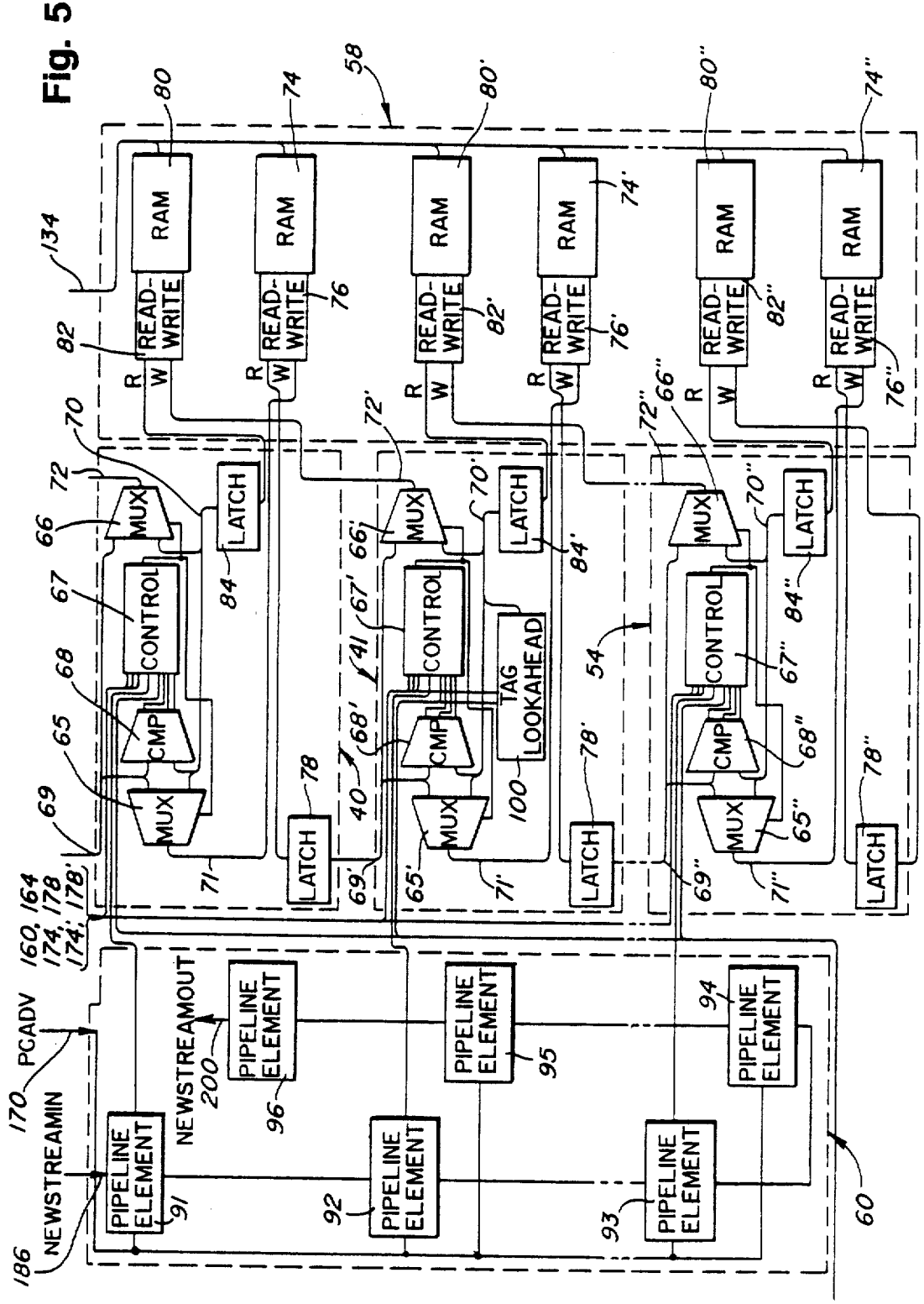

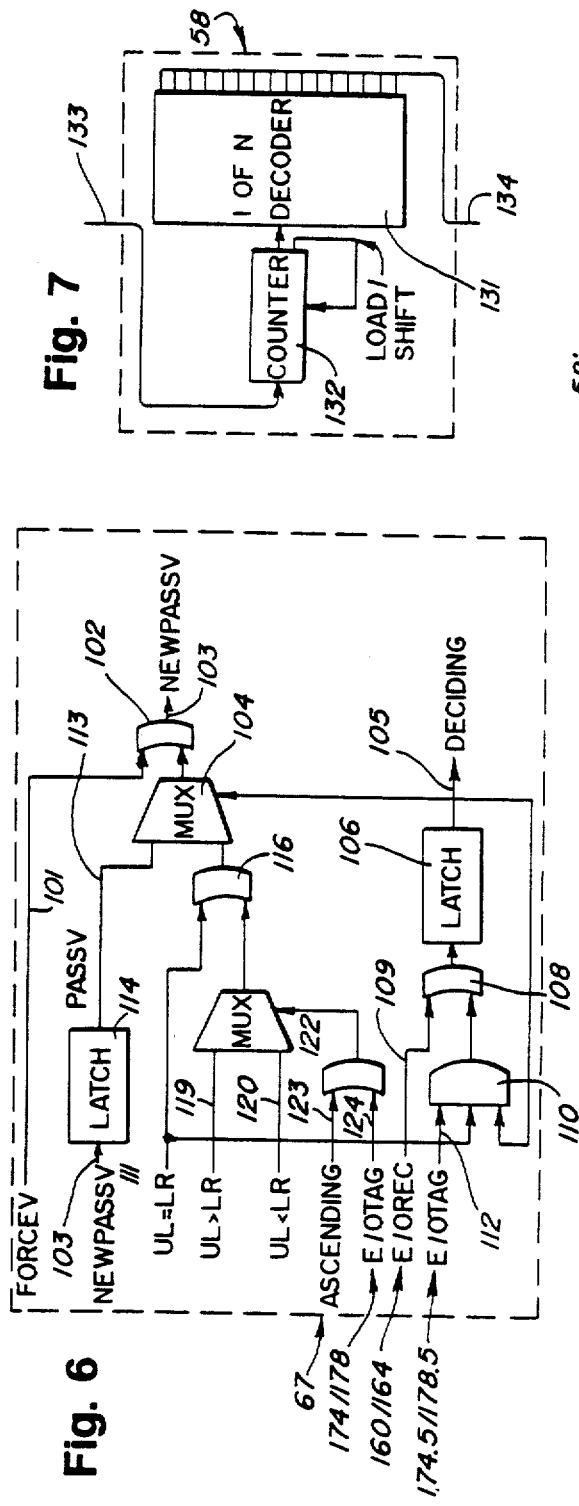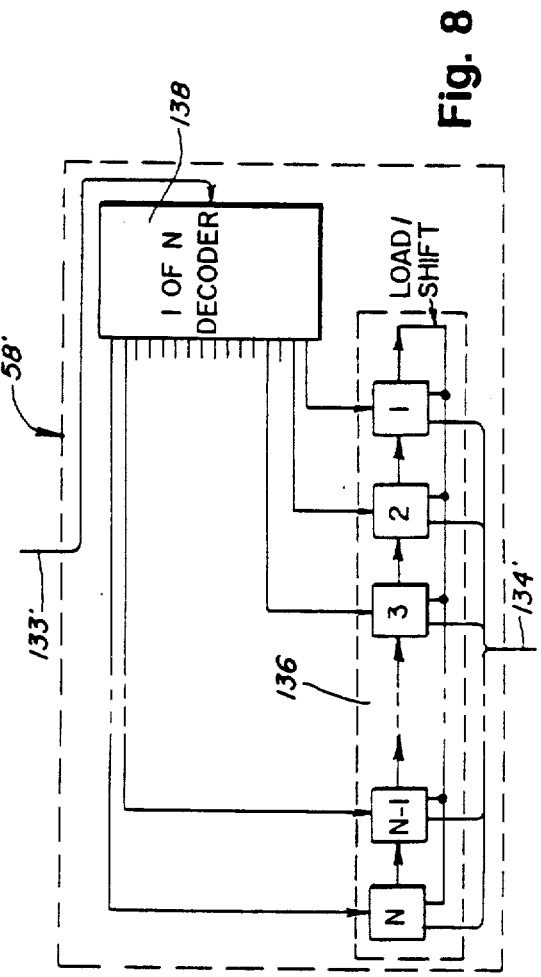

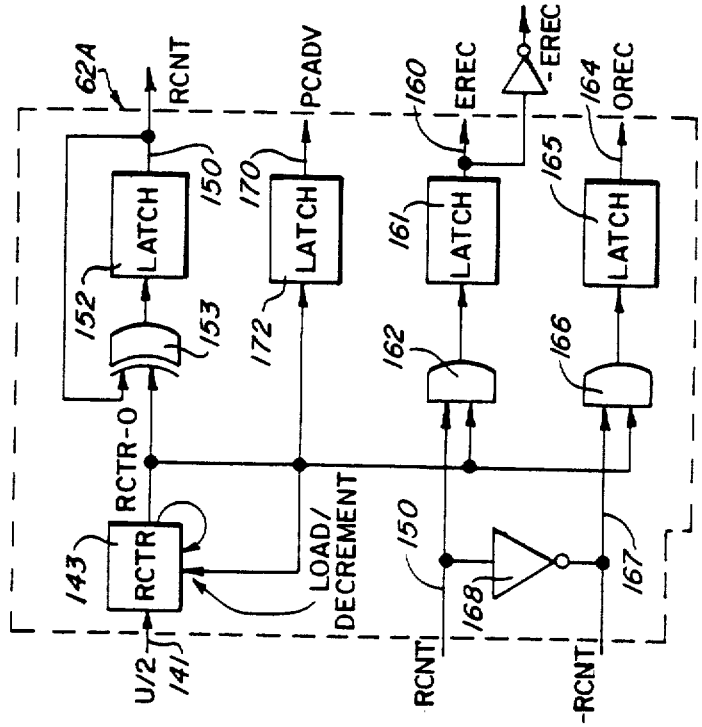

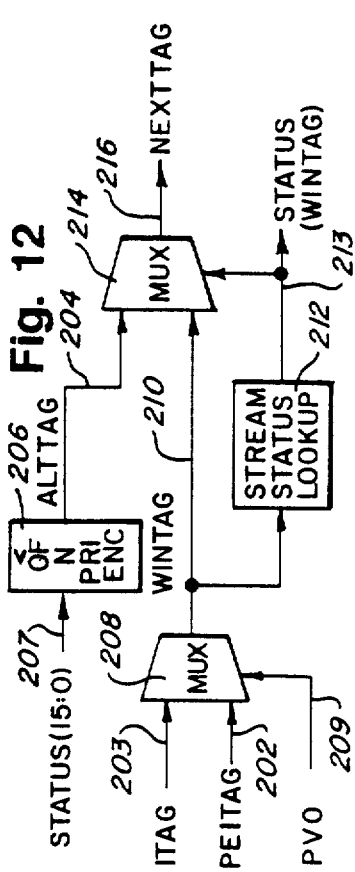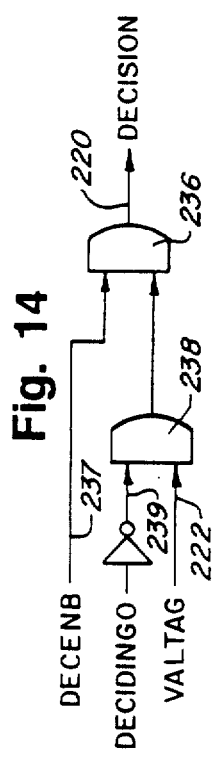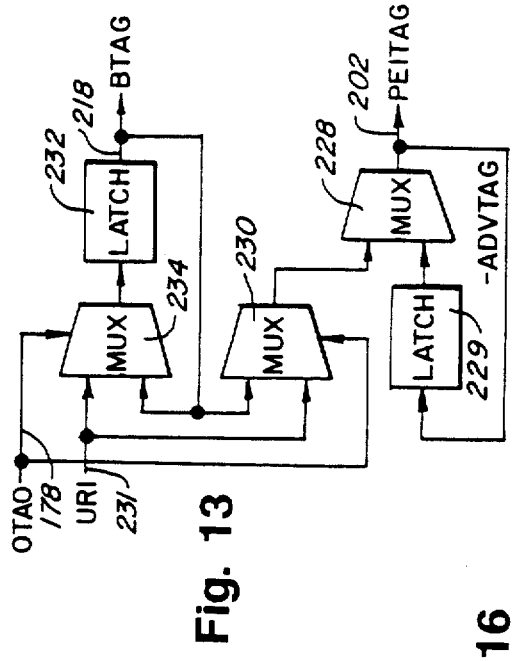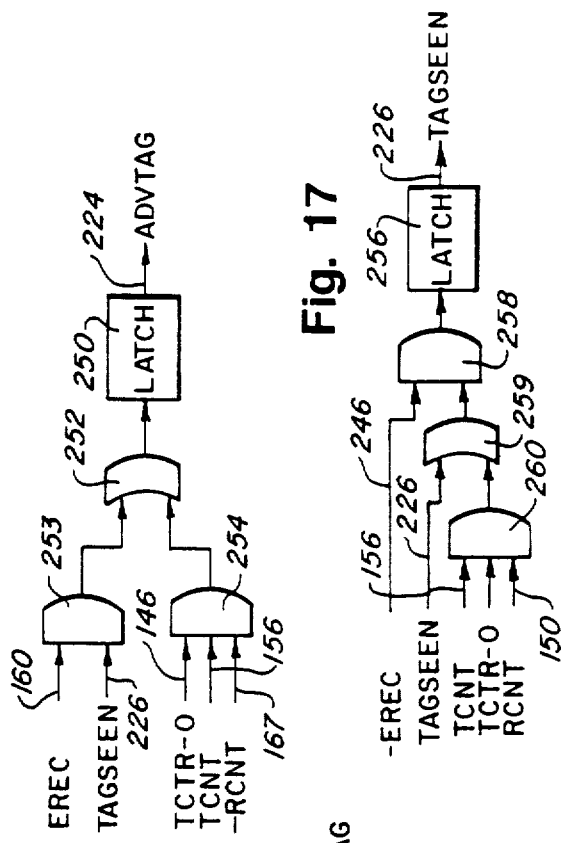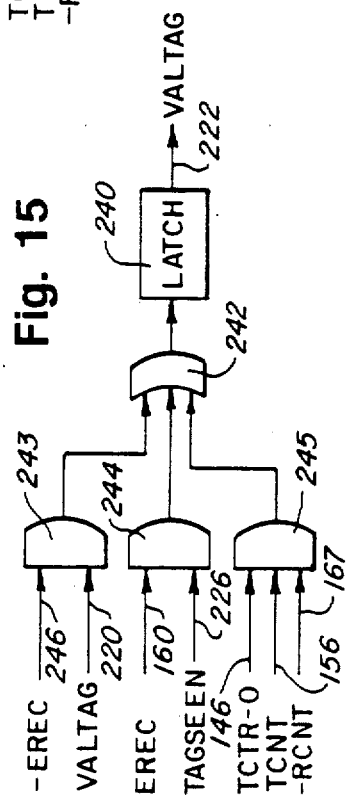

SORT ACCELERATOR WITH REBOUND SORTER REPEATEDLY MERGING SORTED STRINGS

BACKGROUND OF THE INVENTION

1. Field of the Invention

This invention relates to a sort accelerator and more particularly to a sort accelerator in which a rebound sorter is used as a merger and with which large numbers of records can be rapidly and efficiently sorted. The accelerator of the invention operates independently of a host computer and is highly reliable, while using a minimum number of components and being otherwise economically manufacturable.

2. Background of the Prior Art

Pipelined VLSI implementations of sorting algorithms are known. A rebound sorter developed by IBM includes a set of processing elements which can be visualized as forming a U-shaped pipeline with data flowing down along a left side and up along a right side. The processing elements operate concurrently to speed up the sorting process. Each element effects a comparison of data from two records and, depending upon the results of the comparison, effects either vertical movements down along the left side and up along the right side or horizontal exchanges such that "heavier" records are moved to the left and downwardly while "lighter" records move to the right and upwardly to eventually exit the upper end of the right side in sorted order. Rebound sorters of this type have advantages in speeding up sorting operations, but the cost of the required hardware has precluded extensive use of such sorters, particularly for sorting large numbers of records.

Other types of sorting systems have been proposed, using multiple processing elements. All known types of systems have limitations, however, particularly with respect to operating speed, hardware costs, stability and reliability.

SUMMARY OF THE INVENTION

Some aspects of the invention relate to the discovery and recognition of sources of problems and limitations of prior art sorting arrangements. Sorters in which processing operations are performed concurrently by a number of elements are advantageous in speeding up sorting operations, but are limited in that they only allow sorting of a limited number of records. The aforementioned IBM sorter, for example, allows sorting of a group of records containing a maximum of one record more than the total number of sorting elements. Thus fifteen processing elements sort a group which contains a maximum of sixteen records. For large sorts, the amount and cost of hardware using such a system would be prohibitive.

In the sort accelerator of the present invention, a rebound sorter is provided in which a limited number of processing elements are operated concurrently to sort a relatively small number of records into a group. The same rebound sorter is then also used to perform merges of sorted groups into a larger group containing all of the records of the smaller groups in sorted order. With the sort accelerator of the present invention, the same hardware that sorts sixteen data items, for example, is also used to perform a sixteen-way merge. As the number of records to be sorted goes up, increasing numbers of processing elements are not required to accommodate a large sort.

A sort accelerator which incorporates the invention may typically be connected to a host computer and a host memory through an address and data bus. The sort accelerator operates independently of the host processor to sort the records at a high speed and to store the sorted records in the host memory. The independent operation of the sort accelerator enables the host computer to freely perform other operations as the sorting and merging operations take place.

In a preferred embodiment, the sort accelerator includes an input section, an output section, a sort control section, and a sorting section. The sort control section operates to control the input section to effect sequential feeding of groups of records to the sorting section and control the output section to effect storage of a plurality of sorted groups, either in a local working memory or in a working portion of the memory of a host computer. The input, sorting and output sections are controlled from the sort control section to receive groups of records in unsorted order and to then effect sorting and temporary storage of such groups of records in sorted order. It then operates to merge such groups of sorted records into one larger sorted group or string.

The sorting section of the sort accelerator can in one time period sort a maximum of a certain number of records in either descending or ascending order, the certain number being 16 in an illustrated embodiment. Once sorted groups of 16 have been created, those groups can be merged through a series of operations into one large sorted string. Once 16 large sorted strings have been created, they are then merged into a longer string. This process is repeated, producing 16 times larger strings each pass until all records have been sorted. With enhancements, this method sorts at a rate proportional to a value $\leq N \log w$ where "N" is the number of records and "w" is one more than the number of processing elements.

To accomplish such sort and merge functions, the sorting section or rebound sorter need contain only 15 processing elements. A processing element compares key bytes of a record to determine order. Processing elements are connected together via two record storage elements. The arrangement of processing elements and record storage elements can be viewed as a vertical column where new input records enter the top left-hand side of the column and sorted records exit from the top right-hand side of the column.

Records are sorted into groups of 16 and stored in a storage section or workspace memory. Once a sufficient number of groups have been sorted, the merge operation begins. To merge, each record is tagged to indicate what sorted group it belongs to. For ascending sorts, the smallest record of each group is placed in the rebound sorter until the smallest record is pushed out of the rebound sorter. This record is the smallest record amongst all of the smallest records of each individual sorted group. The next record fed into the rebound sorter is chosen sequentially from the group which previously contained the smallest of all records. This new record must be either equal to or greater than the first smallest record since it comes from a sorted group. This procedure continues so that a new record is chosen from the group in which the last output record came from. Once all the strings are exhausted, the merge is complete yielding one large group of sorted records.

To rapidly and efficiently accomplish the sort and merge functions of the present invention, a variety of features have been incorporated into the present design. In cooperation with external hardware, data is checked for corruption from the point where data enters the sort accelerator until it returns to the host processor. Proper operation of the sort and merge features of the sort accelerator are also checked by comparing the size of adjacent records to determine if they have been properly ordered once these records exit the enhanced rebound sorter.

Two methods of detecting the integrity of data as it passes through the system are used. In the first method, byte parity is used to detect errors in data transmission Eight bits of data are represented by a 9 bit value. The extra bit carries a parity value calculated at the data source. Record integrity is checked by re-calculating the parity value from the transmitted data and by comparing the newly calculated value with the transmitted parity bit. An inequality indicates a transmission error.

The second method used to insure data integrity involves using a two level checksum scheme. The checksum is calculated over multiple bytes as each record enters the rebound sorter. The checksum is later re-calculated as records exit the enhanced rebound sorter and compared to the previously calculated checksum. This comparison checks for two types of errors which can occur in the rebound sorter. The first type of error results from a single bit failure in the data path (including storage element failure) and the second results from the improperly controlled swapping of bytes between records (processing element control failure).

The sort order checker examines records as they exit the enhanced rebound sorter for proper sorting. A special storage element acting as a shift register holds one record and in cooperation with comparison logic determines whether the sorted records have been properly ordered. The output of the comparison logic indicates whether the rebound sorter has improperly sorted the records.

The sort order checker also provides a "tie" bit indicating that keys of adjacent records are equal. User software can utilize the "tie" bit to perform sorts on key fields which exceed the capacity of the sort accelerator or to assist the user in performing post-sort elimination of duplicate records.

A sort accelerator constructed in accordance with the invention further includes in a preferred embodiment, features which achieve fast and stable sorting of large numbers of records while minimizing hardware requirements. One particular feature is the pipeline control for performing multiple sort/merge operations in a sort accelerator. The pipeline control allows groups of records to be sorted without mixing records from different groups and without having to flush the rebound sorter with dummy records before a new group of records can be sorted by the rebound sorter.

The pipeline control allows the sort accelerator to begin pushing a new group of records into the rebound sorter immediately after the last record of the previous group has been examined by the first processing element. Pipeline control is accomplished by a series of shift registers in parallel with the rebound sorter. Whenever a new group of records enters the rebound sorter, a boundary value is set in the first pipeline shift register indicating to the processing elements that a new set of records has entered the rebound sorter. The boundary value is shifted through the series of shift registers along with the first record as it passes through the processing element. The value indicates to the processing elements that records following the boundary value must not be compared with records from other groups. In this way, the rebound sorter can remain fully loaded with records, allowing the overlapping of loading and unloading of records from any number of different groups of records.

Another feature of the sort accelerator relates to the performance of a stable sort. A stable sort is one where records with equal keys exit the sort accelerator in the same relative order as they entered. Stable sorting is required by applications where the order of records with equal keys has already been determined. Additional hardware has been added and algorithms have been modified to incorporate stable sorting in the rebound sorter.

Stable sorting is implemented by setting bits which identify a record by the group from which it came. This group designation forces records from different groups having equal keys to exit the rebound sorter in the order in which they entered. An "order" bit causes records from the same group with equal keys to exit the rebound sorter in the order in which they entered.

Still another feature of the sort accelerator relates to a merge lookahead/memory management arrangement through which the required amount of workspace memory need only be approximately 10% greater than the amount of memory required to store the data. Not only does this feature provide for efficient use of memory, but it also provides linear expansion of workspace memory, thereby simplifying host system management of the workspace. Optimal merging reduces the number of times data is processed, and consequently reduces the time it takes to perform the merge/sort algorithm.

Allocation of workspace storage is managed by the sort control section. The sort control section determines whether enough storage has been allocated for the sorted data. In the preferred embodiment, an extended merge/sort algorithm controls the sequencing of sorts and merges through the use of an input and an output phase.

The input phase, consisting of sorts and merges, continues until all of the unsorted records that make up the input string have been processed by either sorting a group of records or merging groups of records. Once all the input records have been either sorted or merged, the output phase begins.

At this point there will be a number of sorted groups or strings existing in multiple regions of workspace storage. The output phase consists of a series of merges followed by a final merge to complete the sorting of the records.

To further increase the speed of the merge function of the sort accelerator, the sort accelerator utilizes a string number or tag extraction lookahead feature. This feature of the present invention utilizes the information produced by the sort control section which indicates which input string a given record is from. This information is necessary to allow the sort control section to deliver the next record to the rebound sorter. As previously described, a proper merge requires that the next input record must come from the same group as the last output record. If the string information is delivered to the sort control section too late, the rebound sorter will stall while waiting for the next input record. In most cases, the tag lookahead provides the tag information to the sort control section before the next sorted record exits the rebound sorter. This allows the next input record to be waiting at the input to the rebound sorter so that no delay occurs in the merge operation.

Tag lookahead logic determines the group of the smallest record (for ascending sorts) as early as practical before it is actually output from the sorter. This allows the sort accelerator to begin accessing the next input record before the next record has been output. Using this technique, the inter-record delay of merges can be totally eliminated except for very short records or in cases where the sort decision is made very late in the record.

One additional feature of the sort accelerator is the use of circulating RAM indexing to implement a variable length shift register used as the record storage element. A RAM is used to hold record data as it passes between processing elements. In this method, the length of a one bit variable length shift register is programmed to allow for varying record sizes. As the bit is shifted through the variable length shift register, it enables each row of the RAM in sequential order, and the RAM either reads or writes data. Consequently, this feature implements a shift register in a way that allows the shift register to vary in length while using a minimal amount of logic. This method also avoids the use of shift registers for the data which are slower and require more power to operate.

Other features and advantages will become more fully apparent from the following detailed description taken in conjunction with the accompanying drawings.

BRIEF DESCRIPTION OF THE DRAWINGS

FIG. 1 is a schematic block diagram of a sort accelerator constructed in accordance with the invention, shown connected to a host computer and host memory;

FIG. 2 shows the format of a record which is developed from an input record, for transmission to an enhanced rebound sorter of the accelerator;

FIG. 5 is a schematic diagram providing a more detailed showing of the construction of the enhanced rebound sorter and an associated storage circuit used in the sort accelerator of FIG. 1;

FIG. 6 shows logic circuitry of a control circuit of a processing element of the rebound sorter shown in FIG. 5;

FIG. 7 shows one form of RAM index circuit usable with the storage circuitry shown in FIGS. 1 and 5;

FIG. 8 shows another form of RAM index circuit usable with the storage circuitry shown in FIGS. 1 and 5;

FIG. 9 shows a portion of a record control circuit of the accelerator of FIG. 1, operable for supplying record timing signals;

FIG. 10 shows another portion of the record control circuit of the accelerator of FIG. 1, operable for supplying tag timing signals;

FIG. 12 shows tag selection circuitry of a string selection logic circuit of a sort sequencer of the accelerator of FIG. 1;

FIGS. 13 through 17 in combination show various portions of tag lookahead logic circuitry of the accelerator of FIG. 1;

DESCRIPTION OF A PREFERRED EMBODIMENT

Figure 4A:
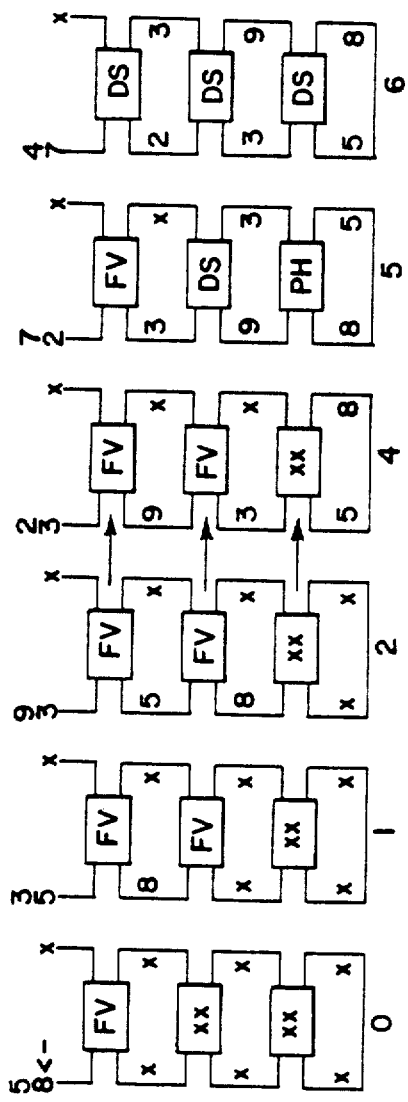
FIGS. 4A and 4B each provide an illustrative simplified example of the flow of data through a sorter such as depicted in FIG. 3.

Reference numeral 10 generally designates a sort accelerator which is constructed in accordance with the principles of the invention. The sort accelerator 10 is shown connected to a host computer 11, a host memory 12, and a workspace memory 18, through an address and data bus 13 and is arranged to receive command data from the host computer 11 to sort records which are stored in the host memory 12 and to store the sorted records in the memory 12.

The command data may include, for example, the start address in memory 12 of one group of records to be sorted or the start addresses of records to be merged, the length of the records in each group, the length of a key field in each record, the desired mode of sorting, the number of records in the group, and the start address in memory 12 in which sorted records are to be stored. Upon receipt of such command data, the sort accelerator 10 operates independently of the host processor to sort or merge the designated records at high speed and to store the sorted records in the host memory 12. The host computer is free to perform other operations after applying a command signal to the sort accelerator 10.

The illustrated sort accelerator 10 includes a local address and data bus 14 which is connected through a system interface 15 to the host bus 13. A local memory 16 which provides workspace is shown connected to the local bus 14. The local memory 16 is optional but working memory is required by the illustrated system. In place of or in addition to the illustrated local memory 16, a portion of the host memory 12 may be used to provide working memory in place of that provided by the local memory 16. The local bus 14 is connected to a rebound sorter 18 through an interface 20 which connects to input section 21, an output section 22 and a sort sequencer 34. As shown, input section 21 includes a parity checker 23, a buffer 24, a LW (long word) to byte unpacker 25, a tag inserter 26 and a check parity/checksum calculator 27. The output section 22 is connected to the sorter 18 through an order checker 29 and includes a checksum calculator and parity generator 30, a byte to long word packer 31, long word buffers 32 and a parity check/generate circuit 33.

The rebound sorter 18 and the interface 20 are connected to a sort sequencer 34 which receives command data sent from the host processor 11 and which monitors and controls input, sorting, storing, merging and output operations as hereinafter described. Sort sequencer 34 includes a register array 35 and an ALU 36 which is connected to an instruction register 37 to operate from a microprogram stored in a ROM 38. The ALU 37 operates to effect supervisory control of input, sorting, merging and output operations. Sort sequencer 34 also includes a sort sequence, tag lookahead and miscellaneous control circuitry 39 which operates to select addresses sent to the input section 21 for rapid fetching of records from memory during sorting and merging operations and to perform other functions.

The enhanced rebound sorter 18 is designed to effect simultaneous processing operations on a group of 16 records through examination of the keys of such records. It includes fifteen sections 40-54 in which such processing operations are performed, the number of sections being one less than the number of records of the group being processed. Each of the sections 40-54 includes a processing element and associated record storage elements. Features of the rebound sorter 18 relate to the implementation of record storage elements through the use of a storage circuit 56 which includes a RAM and read and write circuits and which operates under control of a RAM index circuit 58.

Further features relate to the provision of a pipeline control circuit 60 for controlling loading and emptying of the enhanced rebound sorter 18 so as to avoid delays, while preventing mixing of separate groups of records. A record control circuit 62 applies timing signals to the processing elements of the sections 40-54 and to the pipeline control circuit 60.

Additional features relate to the use of the enhanced rebound sorter 18 for both sorting and merging operations in a manner such as to achieve fast sorting of large numbers of records while minimizing hardware requirements and achieving other advantages. A specific feature relates to identifying the individual records during processing operations in a manner such as to facilitate stable and reliable sorting of records and merging of sorted records as hereinafter described.

In operation of the sort accelerator as thus far described, command data is initially sent through the interface section to the sort sequencer 34. The sort sequencer 34 develops and stores corresponding control data in the register array 35, including the starting address of a first record of each group of records to be input, the length of the records of the group, the length of a key field of each record, the number of records and the starting address and other data with respect to where sorted records are to be stored. After the command data is sent through the sort sequencer 34, an operation is then initiated in which the input section 21 operates using the address circuit 23 to fetch record data from the host memory 12, followed by another operation by the input section 21 which then uses the byte inserter 25 to develop modified records. A continuous stream of modified records may be sent to the rebound sorter 18, each modified record consisting of a certain even number of serial bytes.

Preferably, each modified record may have a form as shown in FIG. 2, including one or more leading key bytes K which enter the sorter first and which are followed by a tag byte T (added by the byte inserter 25) and one or more data bytes D. A trailing pad byte P, as shown, is added by the byte inserter 25 to each record if it is necessary to obtain an even number of bytes in the record.

The insertion of the tag byte T is a feature providing a reliable and efficient way of identifying the input string from which a given record came and to facilitate rapid merging operations as hereinafter discussed. In accordance with another feature, each record includes an "order" bit which is used to insure a highly stable sorting operation as also discussed hereinafter, the "order" bit being preferably included in the tag byte.

In an input phase of operation, a sorting operation is performed in which a group of 16 records are shifted into the illustrated rebound sorter 18. Immediately upon shifting of the last record of a group into the rebound sorter 18, the records of the group of 16 start to exit the rebound sorter serially in sorted order. A sorted string of 16 records is thus formed which is sent by the output section 22 into a section of the workspace memory 16.

Other features relate to the use of the pipeline control circuit 60 to enhance the speed of operation. As each sorted group of 16 records starts to exit the rebound sorter 18, another sorting operation is initiated in which another group of 16 records is in effect simultaneously shifted into the rebound sorter 18. The pipeline control circuit 60 is designed to permit this operation without mixing the records of the two groups.

As a second string of 16 records is then sorted and sent by the output section 22 to be stored in the workspace memory 16, a third group of 16 records is shifted into the rebound sorter 18, followed by a fourth and subsequent groups of 16 records until 16 strings of 16 sorted records each are stored in the workspace memory 16. Then an "up-merge" operation is performed, as hereinafter discussed in detail, in which records from the 16 sorted strings of 16 records each are fetched in a certain order and shifted into the rebound sorter 18 to produce a single string of 256 sorted records which is stored in the workspace memory. A merge can be started immediately following the last record or a sort or another merge.

After a single string of 256 records is stored, another series of sorting operations are performed in which another 16 strings of 16 records each are stored in the workspace memory 16, followed by another up-merge operation in which a second string of 256 sorted records is produced and stored. After producing and storing of up to 16 of such strings of 256 records each, still another up-merge operation may be performed to produce and store a single string of 4096 records.

If the input string has more than 4096 records, additional sorting and up-merging operations are performed until the entire input string is processed. In the input phase, records may be sorted into a number of strings all containing 4096 records, except the final string which may contain a lesser number depending upon the length of the input string. The number of such strings which may be produced is limited only by the available memory.

At the completion of the sorting and up-merging operations of the input phase, an output phase is initiated in which merges are performed as may be necessary to reduce the number of strings to 16 or less, followed by a final merge in which the sorted records are written directly to the host memory 12 starting at the addresses designated in the initial command from the host computer 11. Still other relate to management of the storage in working or intermediate memory of strings to be merged and to the manner of supplying stored strings from intermediate memory to the rebound sorter 18 for merging.

The sort accelerator 10 also includes features which relate to checking operations, including parity and checksum checks which are so performed as to allow optimum sorting and merging operations while detecting processing errors and insuring integrity of the sorted records which are output from the sort accelerator 10.

Rebound Sorter with Pipeline Control (FIG'S. 3-5)

Figure 4B:
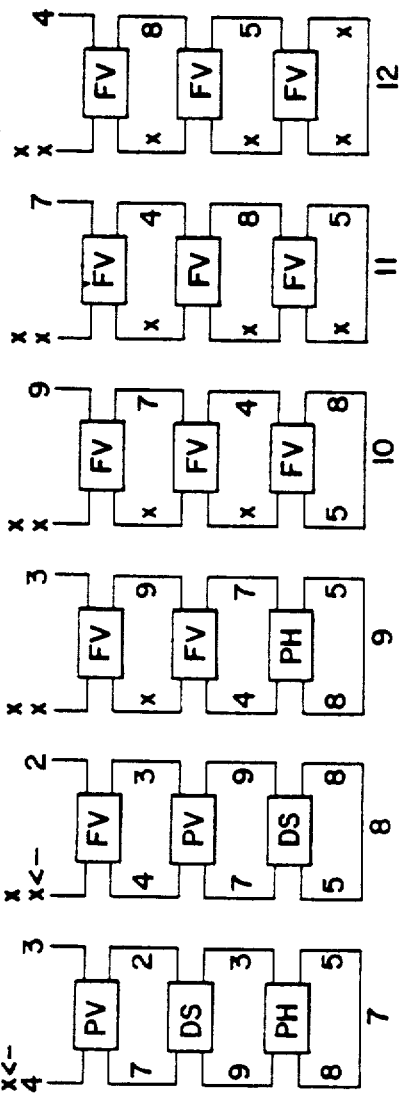
Figure 3:
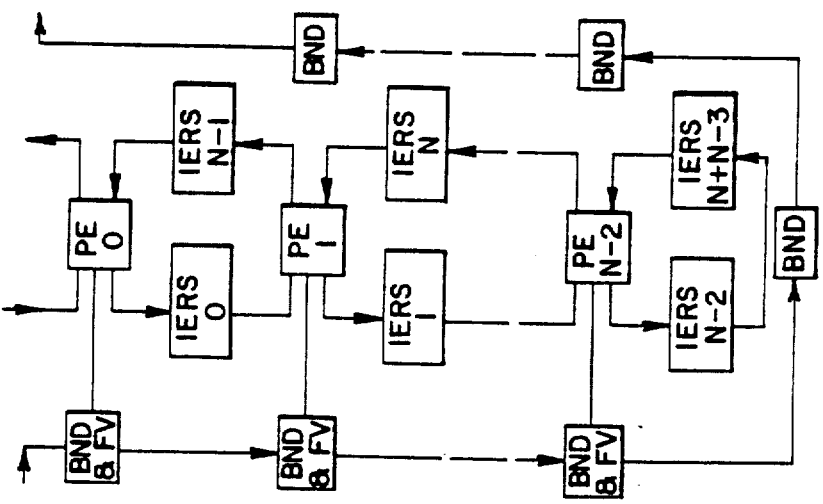
FIG. 3 is a schematic diagram showing a rebound sorter of the accelerator of the invention in a simplified and generalized form and portions of associated storage and pipeline circuits.

The heart of the sort accelerator 10 is the rebound sorter 18 which is shown in a simplified form in FIG. 3. FIGS. 4A and 4B provide an illustrative simplified example of the flow of data through the sorter. A more detailed showing of the construction of the rebound sorter 18 is provided by FIG. 5, individual circuits of the sorter 18 being shown in other figures of the drawings.

The sorter 18 operates to arrange records in an order according to the numeric values assigned to keys of the records which may typically be bytes providing ASCII representations of names or numbers. The sorter may operate to sort the records in either ascending or descending order, as desired. In describing operation herein and to minimize confusion, the terms "larger" and "smaller" are used when referring to comparisons of record keys. It will be understood that the actual key values associated with "larger" and "smaller" keys will depend on whether the sort being performed is ascending or descending and the use herein of the terms "larger" and "smaller" should not be construed as a limitation on the invention.

Referring to FIG. 3, the sorter 18 is an $N-1$ element rebound sorter which is capable of effectively comparing N record keys. N is 16 in the illustrated embodiment in which $N-1$ processing elements are indicated as $PE_0-PE_{N-1}$ and are included in the sections 40-54 shown in FIG. 1.

Key comparisons are performed one byte at a time, with all of the $N-1$ processing elements or operating in parallel. Comparisons of bytes of keys continues until bytes from keys being compared are unequal. At that point, a decision is made as to which key is the larger, based on the unsigned binary value of the bytes. For ascending sorts, the larger key is the one with the larger unsigned binary byte value. For descending sorts, the larger key is the one with the smaller unsigned binary byte value.

The $N-1$ element rebound sorter can be viewed as a black box with the following characteristics. After being loaded with $N-1$ records, whenever a new record is put into the box, the smallest of the new record and $N-1$ records already in the box emerges from the box.

As shown schematically in FIG. 3, a rebound sorter consists of the aforementioned $N-1$ processing elements or connected via inter-element record storage sections each designated as an IERS, two IERS's being associated with each PE. Each PE accepts 2 input bytes and produces 2 output bytes every time period. Each IERS accepts 1 byte and produces 1 byte every time period. Each IERS holds half of a record and operates as a shift register. A byte input to the IERS is produced at the output R/2 time periods later, where R is the number of bytes in a record. The arrangement of processing elements and inter-element record storage can be viewed as a vertical column where new records enter and exit the column at the top left and right of FIG. 3.

The IERS elements are connected to the PEs in the following fashion:

a) The output byte from PEm going down the column is the input to IERSm.

b) The output of IERSm is the input to $PEm+1$ going down, except for $IERSN-2$ which is the input to $IERSN+N-3$. The input to the rebound sorter is the input to PE0.

c) The output byte from PEm going up the column is the input to $IERSN-1+m-1$, except for PE0 where it is the output of the sorter.

d) The output of $IERSN-1+m-1$ is the input to $PEm-1$.

Records with larger keys (those that sort later in the final sequence) fall toward the bottom of the column; while records with smaller keys (those that sort earlier in the final sequence) rise toward the top of the column. In the accelerator of the invention, groups of records to be compared are separated by creating a "boundary" condition which prevents new records entering the column from being mixed with records already in the column. This effectively flushes one group from the column while loading a new group.

Each PE begins processing when the first byte of a record coming down and a record coming up the column are presented to it. If the record coming down is larger than the record coming up, it continues down the column while the record coming up continues up the column. If the record coming down is smaller than the record coming up, it is sent back up the column while the record coming up is sent back down the column. Since each IERS contains only half a record, the even numbered PEs are half a record out of phase with the odd numbered PEs.

The pipeline control of the accelerator of the invention controls the sequencing of the PEs so they know when new records are presented, when the end of the key is reached, and whether or not to compare them at all ("boundary" condition).

In FIGS. 4A and 4B, a simplified three element rebound sorter is shown sorting a set of four 2-byte records, it being noted that the illustrated accelerator 10 requires a minimum of 4 bytes, two bytes being used in this example for simplicity. Consider the following input sequence to the simplified rebound sorter as depicted, every 2 digits being a record:

85393274

In this example, the following assumptions are used:
a) The key is the entire record.
b) The boxes represent processing elements.
c) Vertical lines between the boxes represent inter-element record storage which will hold 1 digit.
d) The numbers shown next to the vertical lines represent the values of the data contained in the IERS. An "x" indicates "don't care" data.
e) The symbol "<-" will mark the first byte of a new group (a "boundary" condition).
f) PE states are indicated by "DS", "PV", "PH", "FV", and "xx" symbols shown within the PE's:
g) DS=Deciding State (passing vertically)
h) PV=Passing vertically
i) PH=Passing horizontally
j) FV=Force vertical (passing vertically)
k) xx=Don't care.

The states shown are useful in understanding the operation of the sorter. For example, the initial state of the PE's is "FV" to load the data into the IERS. After the 4th clock, the lowest PE element enters the "DS" (deciding) state, and the first possible comparison between two records may occur.

After 14 clocks the final data value, 5, appears at the sorter output. The output stream is thus "32397485".

In FIG. 5, the processing elements PE0, PE1 and PEN-2 referred to in the foregoing discussion are contained in the sections 40, 41 and 54.

The processing element of the section 40 includes two multiplexers 65 and 66, a control circuit 67 and a comparator 68. A "UL" input line 69 at the upper left is connected to one input of the multiplexer 65 and one input of the multiplexer 66. A second "LR" input line 70 is connected to a second input of the multiplexer 65 and a second input of the multiplexer 66. The outputs of the multiplexer 65 and 66 are respectively connected to a lower left or "LL" output line 71 and an upper right or "UR" output line 72. The multiplexers 65 and 66 are controlled by a control circuit 67 which is controlled from the output of the comparator 68, the inputs of comparator 68 being connected to the "UL" line 69 and the "LR" line 70.

When the processing element is operative to pass bytes vertically, the multiplexers 65 and 66 are so controlled that the bytes pass from the "UL" line 69 downwardly to the "LL" line 71 while bytes pass upwardly from the "LR" line 70 to the "UR" line 72. In an opposite condition in which the bytes are passed horizontally, the bytes input on the "UL" line 69 are transmitted through multiplexer 66 to the "UR" line 72 while the bytes input on the "LR" line 70 are transmitted to the left through multiplexer 65 to the "LL" line 71. It should be understood that the lines 69v72 provide plural signal paths so as to transmit all bits of a byte in parallel, the bytes being transmitted one by one in byte-serial fashion.

All processing elements of the sections 40–54 perform the same functions. Each processing element receives the following information during each time period:

a) The next byte of the record coming down the column, applied through the "UL" line 69 of FIG. 5.

b) The next byte of the record coming up the column, applied through the "LR" line 70 of FIG. 5.

c) A boolean value which is true if the current bytes are the last bytes of the records, and false otherwise. (This value is termed "E/OREC" in FIG. 6 which is described hereinafter and which shows PE control logic; it is termed "EREC" for even numbered PE's and "OREC" for odd numbered PE's.)

d) A boolean value which is true if the current otherwise. (This value is termed "E/OTAG" in FIG. 6 and is termed "ETAG" and "OTAG" for even and odd numbered PE's.)

e) A boolean value which is true if the current records are being "forced to pass vertically", and false otherwise. To "pass vertically" means that the byte from the record coming down the column is to be passed on down the column, while the byte from the record coming up the column is to be passed on up the column. (This value is termed "FORCEV" in FIG. 6.)

f) A boolean value which is true for "ascending" sorts, and false for "descending" sorts. (This value is termed "ASCENDING" in FIG. 6.)

Each processing element maintains the following internal state information:

a) A boolean value which is true if no decision has been made regarding which of the current records is "larger", and false otherwise. ("DECIDING" in FIG. 6.)

b) A boolean value used after a decision has been made and which is true if bytes are being "passed vertical", and false if bytes are being "passed horizontal". ("PASSV" in FIG. 6.)

Based on the information received and the current internal state information, each processing element produces the following information during each time period:

a) The next byte to be passed down the column. This byte is passed down from the "LL" line 71 in FIG. 5.

b) The next byte to be passed up the column. This byte is passed up from the "UR" line 72 in FIG. 5.

c) New values for the internal state information.

The operation of a processing element can now be described simply, in terms of the above information. If the processing element is being forced to pass vertically, then all bytes of the record coming down are passed down and the bytes of the record coming up are passed up, independent of the decision process below. This is used to load the sorter, empty it, and to separate groups of records to be sorted.

If the processing element is not being forced to pass vertically, then the following applies. If a decision has already been made, bytes continue to be passed vertically or horizontally based on the decision made previously. Otherwise, the current input bytes are compared. If they are unequal a decision is made at this time. If the byte coming up is larger than the byte coming down, then the byte coming up is passed down while the byte coming down is passed up (pass horizontal). Otherwise, the byte coming up is passed up while the byte coming down is passed down (pass vertical). When a decision is made, the processing element remembers whether it passed vertically or horizontally, in order to pass the remaining bytes of each record in the same direction.

The state of the ascending/descending input is used to determine the sense of larger and smaller in the comparison.

Each inter-element record storage section or IERS of FIG. 3 is a variable length shift register containing a half record of bytes. For a record length of R, a byte input to an IERS at time period T, will be produced at its output at time period $T+R/2$. This means that the shift register must be of length $R/2$. As aforementioned, the user record has at least one byte added (the tag byte) and if the resultant length is odd, a pad byte is also added.

In the circuitry as shown in FIG. 5, each shift register is implemented by using RAM sections of the storage circuit 56 in combination with latches which provide a stable interface to comparator logic. The first shift register IERS0 of FIG. 3 is implemented by a RAM section 74 and a read-write circuit 76 which has a write input connected to the "LL" output line 71 and which has a read output connected through an output latch circuit 78 to the "UL" input line 69' of the next section 41. The output latch circuit 78 forms an extra row of the shift register and insures stable conditions for comparison of key bytes. Since the latch for the extra row and at least 1 RAM row must be in the data path, the minimum size of the shift register is 2 rows. This sets the minimum record length for the rebound sorter at 4 bytes.

The RAM has a number of rows equal to half the maximum record size minus 1, and a number of columns equal to 2 times the number of processing elements times 8. In the current implementation, the number of processing elements is 15, making each row 2×15×8, or 240 bits wide. Since the maximum record size is 40, there are (40/2)−1, or 19 rows. This makes a total RAM size of 4560 bits.

In fashion similar to the implementation of the shift register IERS0 by RAM section 74 and read-write circuit 76, the shift register IERSN-1 of FIG. 3 is implemented by a RAM section 80 and a read-write circuit 82 which has a write input connected to the "UR" output line of the section 41 and which has a read output connected through an output latch circuit 84 connected to the line "LR" line 70 of the processing element of section 40. The output latch circuit 84, like the latch circuit 78, forms an extra row of the shift register.

The processing elements and shift registers of the sections 41 and 54 illustrated in FIG. 5 are substantially identical to those of the section 40, corresponding components being indicated by primed and double-primed numbers. The section 41 is an exception, in that it is shown as including a tag lookahead circuit 100, operative to avoid processing interruptions in a manner as hereinafter described in connection with FIGS. 13-17. The row enables of the RAM sections 74 and 80 and those for the other sections 41-54 of the sorter 18 are driven from a RAM index circuit, two circuits 58 and 58' of different forms being shown in FIGS. 7 and 8, as described hereinafter.

The sections 41-54 of the sorter 18 are connected to the pipeline control circuit 60 which includes elements arranged to store boundary indications, such indications being shifted from one element to another in synchronism with the shifting of records in the sorter 18. Certain of the elements apply "FORCEV" signals to the control circuits of the processing elements to cause the processing elements to shift only in the vertical direction during certain conditions and to avoid mixing of records of one group with records of another group.

The pipeline elements which apply the "FORCEV" signals to the sections 40, 41 and 54 are indicated by reference numerals 91, 92 and 93 in FIG. 5, such elements being also operative for shifting of boundary condition signals. Additional pipeline elements are used solely for shifting of boundary condition signals, the pipeline elements for the sections 54, 41 and 40 being respectively indicated by reference numerals 94, 95 and 96. The operation of the pipeline elements is described in detail hereinafter in connection with FIG. 11.

Processing element control logic (FIG. 6)

FIG. 6 shows logic circuitry of the control circuit 67 of the section 40, similar logic circuitry being included in the control circuits 67' and 67" and the control circuits of the other sections of the sorter 18. The aforementioned "FORCEV" signal is applied through a line 101 to one input of an OR gate 102 which develops an output on a "NEW PASS V" line 103. A second input of the OR gate 102 is connected to the output of a multiplexer 104 which is controlled by a "DECIDING" signal on a line 105 connected to the output of a latch 106. The latch 106 is controlled through an OR gate 108 either from a "E/OREC" signal on a line 109 or from a signal applied from the output of an AND gate 110 which has three inputs.

One input of "AND" gate 110 is connected to the "DECIDING" line 105. The second input is connected through a line 111 to an output of the comparator circuit 68 at which a "UL=LR" signal is developed when the signals at the upper left and lower right inputs 69 and 70 are equal. The third input of the AND gate is connected to a "−E/OTAG" line 112.

The multiplexer 104 has one input connected to a "PASS V" line 113 which is connected to the output of a latch 114 to which the "NEW PASS V" signal on line 103 is applied. A second input of the multiplexer 104 is connected to the output of an OR gate 116 which has one input connected to the "UL=LR" line 111 and which has a second input connected to the output of a multiplexer 118. One input of the multiplexer 118 is connected through a line 119 to a "UL>LR" signal line from the comparator 68.

A second input is connected to a "UL<LR" signal applied on line 120 from the comparator circuit 68. The multiplexer 118 is controlled from the output of an OR gate 122 which has input lines 123 and 124 connected to which "ASCENDING" and "E/OTAG" signals are applied. The operation of the control logic of FIG. 6 will be apparent from the foregoing discussion of the operations performed by the PE elements.

As aforementioned, the row enables of the RAM sections 74 and 84 and those for the other sections 41-54 of the sorter 18 are driven from a RAM index circuit, two circuits 58 and 58' of different forms being shown in FIGS. 7 and 8.

RAM index circuit (FIG. 7)

The RAM index circuit 58 of FIG. 7 comprises a single decoder 131 and a counter 132. The counter is loaded through a count input line 133 with a count of U/2, counts down to 1 after being loaded with each count, and then the operation is repeated. The output of the counter 132 is fed through the decoder 131 and through a multiconductor output line 134 to the RAM sections 74 and 84 for section 40 and to the corresponding RAM sections of the other sections 41-54. The outputs of the decoder 131 then drive the RAM row enables, first for the read and then the write before advancing to the next row. The initial value at startup and after the counter reaches 1 (U/2), comes from the all but the low order bit of the user specified record size (divide by 2). It should be remembered that the user record has at least 1 byte added (the tag byte) and if the resultant length is odd, a pad byte is also added. This means that if the user record size is U, then U/2=(R/2)−1.

Alternate RAM index circuit (FIG. 8)

The RAM index circuit 58' of FIG. 8 reduces the minimum cycle time of the addressing logic at the expense of additional logic. The circuit 58' drives the RAM row enables of the storage circuit 56 from a 1 bit variable length shift register 136 which has a number of stages corresponding to the maximum length of a half record with outputs connected through a multi-conductor line 134' to the row enables of the storage circuit 56. The stages of shift register 136 are configured in a ring. The length of the shift register is configured to be half the record length minus 1 through the application of initial control data applied through a multi-conductor line 133' to a decoder 138, such control data being applied after the record length has been determined from control data supplied from the host processor. A single bit circulates around the shift register ring providing row enable for first the read and then the write before advancing to the next row.

To achieve the operation of the shift register 136 as a ring, the input of the decoder 138 is all but the low order bit of the user record length, which is half the record length input to the sorter 18 minus one. The outputs of the decoder are connected to the shift register, such that the exit end of the shift register is connected to the decoder output that is asserted when a 0 is input to the decoder. The next bit of the shift register (the one that shifts into bit 0) is connected to the decoder output that is asserted when a 1 is input to the decoder, and so on.

Thus the output of decoder 138 loads a single bit into the shift register that will shift out of the shift register after N shifts, where N is half the record length minus one. This is done at initialization and whenever the bit exits the shift register, thus forming the ring. Between shifts, the enabled row is first read and then written.

Record control circuit 62 (FIGS. 9 and 10)

FIGS. 9 and 10 show portions of the record control circuit 62. A portion 62A shown in FIG. 9 is used primarily for record timing while a portion 62B shown in FIG. 10 is used primarily for tag timing. These portions produce timing information for the processing elements and the pipeline control. The record control circuits of FIGS. 9 and 10 receive the following information during initialization:

a) Half the user record size, U/2, which is truncated toward 0 if record size is odd and which is applied on a line 141 in FIG. 9.

b) Key size, applied on a line 142 in FIG. 10.

The record control circuits of FIGS. 9 and 10 include components and maintain internal state conditions and information, as follows:

a) A record byte counter, "RCTR" 143 in FIG. 9, which is initialized to U/2 and decremented every time period by a load/decrement signal derived from the counter value (load at initialization or when RLTR=1, decrement otherwise). If decremented past zero, counter 143 is reset to U/2.

b) A tag byte counter, "TCTR" 146 in FIG. 10, which is initialized to K through a signal which is applied through a multiplexer 148 controlled by a signal applied on a "INIT" line 149. The counter 146 is decremented every time period by the signal on line 144. If counter 146 is 0 when decremented, it is set to U/2- through a signal applied from line 141 through multiplexer 148.

c) A boolean value "RCNT" produced on a line 150 in FIG. 9 at the output of a latch circuit 152 which has an input connected to the output of an exclusive OR circuit 153 having one input connected to a "RCTR=0" output of counter 143 and a second input connected to line 150. The value "RCNT638 indicates which half record is in progress in each PE. It is initialized to false indicating that the first half of records are entering the even PEs, and the second half of records are entering the odd PEs. It changes whenever the record byte counter is decremented past zero. If it is false it becomes true, and if it is true it becomes false.

d) A boolean value "TCNT" indicating whether the odd or even PE's will see a tag byte next, produced on a line 156 in FIG. 10 at the output of a latch circuit 157 which is connected to the output of an exclusive 0R circuit 158 having one input connected to a "TCTR=0" line at the output of counter 146 and having a second input connected to the line 156.

Based on the internal state information, the record control produces the following outputs:

a) A boolean value "EREC" indicating that the last byte of a record is being presented to the even processing elements, produced on a line 160 which is connected to a latch circuit 161 at the output of an AND circuit 162 having inputs connected to the "RCNT" line 150 and to the "RCTR=0"60 output of the "RCTR" counter 143.

b) A boolean value "OREC" indicating that the last byte of a record is being presented to the odd processing elements, produced on a line 164 which is connected to a latch circuit 165 at the output of an AND circuit 166 having inputs connected to the "RCTR=0" output of counter 143 and to a "−RCNT" line 167 which is connected through an inverter 168 to the "RCNT" line 150.

c) A boolean value "PCADV" indicating that the first byte of a record is being presented to either the even or odd processing elements, produced on a line 170 at the output of a latch circuit 172 connected to the "RCTR=0" output of the counter 143.

d) A boolean value "ETAG" indicating that the first byte following the record key, i.e. the "tag" byte, is being presented to the even processing elements, produced on a line 174 which is connected to a latch circuit 175 at the output of an AND circuit 176 having inputs connected to the "TCNT" line 156 and to the "TCTR=0" output of the "TCTR" counter 146.

e) A boolean value "OTAG" indicating that the first byte following the record key is being presented to the odd processing elements, produced on a line 178 which is connected to a latch circuit 179 at the output of an ASND circuit 180 having inputs connected to the "TCTR=0" output of counter 146 and to a "−TCNT" line 181 which is connected through an inverter 182 to the "TCNT" line 150.

Figure 11:
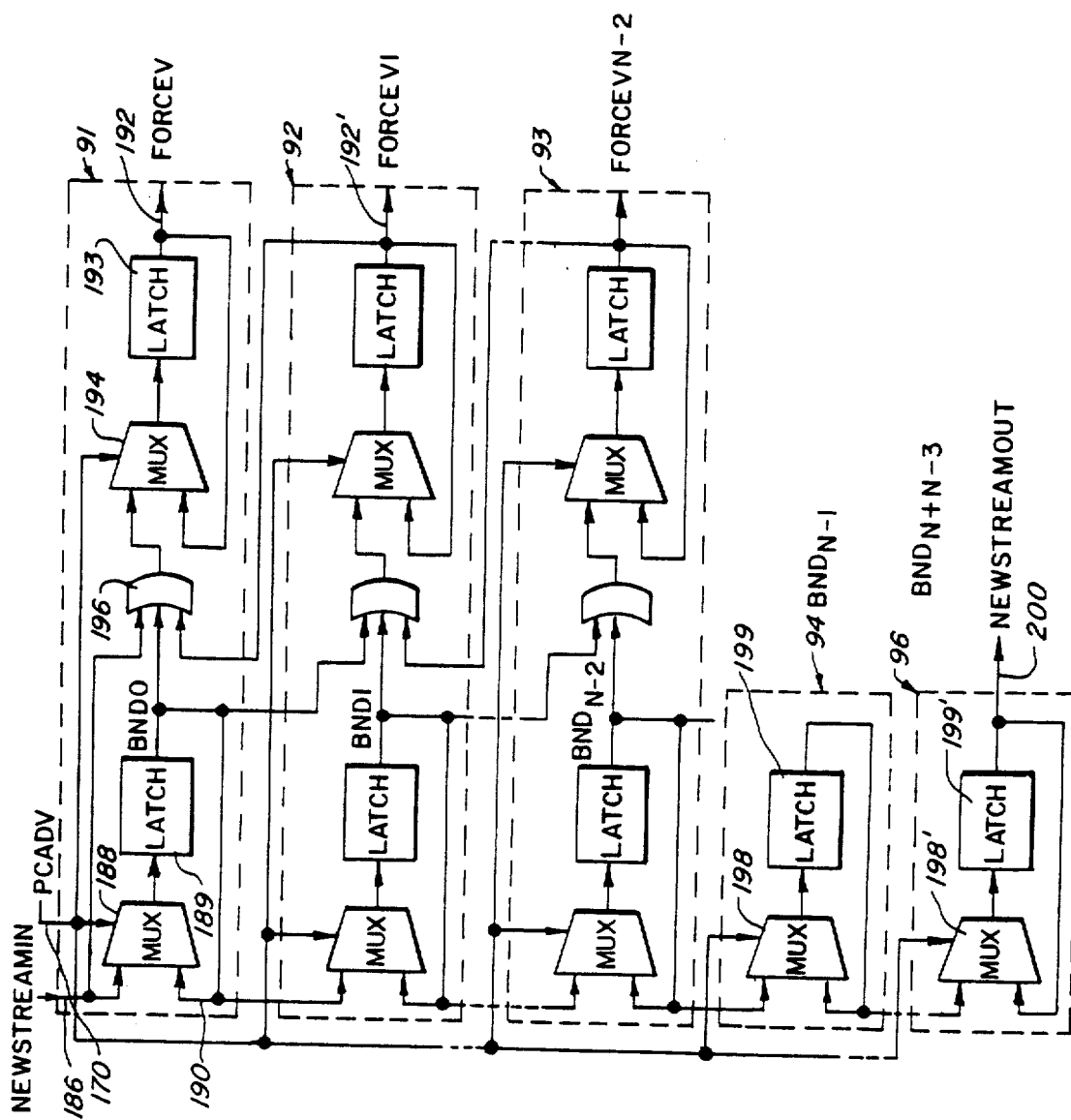
FIG. 11 shows details of a pipeline control circuit shown generally in FIG. 1 and FIG. 5.

Pipeline Control Circuit 60 (FIG. 11)

Very important features relate to the pipeline control circuit 60 which allows the rebound sorter to be loaded and emptied, and prevents separate groups of records from becoming mixed.

Circuitry of the pipeline elements 91–94 and 96 of the circuit 60 are shown in FIG. 11. The pipeline element 91, which is associated with the processing element of the first section 40 of the sorter 18, includes an input line 186 to which a signal is applied in synchronized relation to the input of a new record to the sorter. The input line 186 is connected to one input of a multiplexer 188 having an output connected to a latch 189, the output of the latch being connected to a line 190 which is connected to a second input of the multiplexer 188.

A "FORCEVO" signal is developed on a line 192 at the output of a latch 193 which is connected to the output of a multiplexer 194, one input of the multiplexer 194 being connected to the line 192 and a second input thereof being connected to the output of an OR gate 196. Inputs of the OR gate 196 are connected to the lines 186 and 190 and into a "FORCEV1" line 192' of the next-following stage.

The multiplexers 188 and 194 are controlled by the "PCADV" signal applied through line 170 from the record control circuit 162A of FIG. 9. The circuits of all other pipeline elements associated with the sorter processing elements are substantially identical to that of the element 91. Except that line 186 comes from "BNDm−1"60 and in 93 there is no "FORCEVm+1" input.

The circuits of the pipeline elements 94 and 96 are also shown in FIG. 11. The element 94 includes a multiplexer 198 and latch 199 which correspond to the multiplexer 188 and latch 189 of the element 91. Similarly, the element 96 includes a multiplexer 198' and a latch 199', and a final output signal "NEWSTREAMOUT" being developed on a line 200.

In operation, the pipeline control circuit 60 receives the following information during each time period:

a) The boolean value "PCADV" from circuit portions 62A (FIG. 9) which indicates that the first byte of a record is being presented to either the even or odd processing elements.

b) A boolean value "NEWSTREAM" applied on a line 186, indicating that the current byte being presented to the rebound sorter starts a new group of records to be sorted separately from those already in the rebound sorter.

The pipeline control circuit 60 maintains the following internal state information:

a) A boolean value "BNDO" through "BNDN−2" for each PE produced at the line 190 of element 91 and its corresponding lines of the other elements. This value indicates that a "boundary" between record groups has come "down" the rebound sorter to that PE since the last time the first byte of a record was presented to either the even or odd processing elements.

b) The boolean value "BNDN−1" indicates that a "boundary" between record groups has moved from IERS "N−2" into IERS "N+N−3" since the last time the first byte of a record was presented to either the even or odd processing elements.

c) Boolean values for processing elements "PEN−2" through "PE1", produced by elements following 94 thru 96 shown in FIG. 11, each such value indicates that a "boundary" between record groups has come back "up" the rebound sorter to that PE since the last time the first byte of a record was presented to either the even or odd processing elements.

d) A boolean value ("FORCEVO" through "FORCEVN−2", FIG. 11) for each processing element indicating that that processing element is being "forced to pass vertically".

Based on the information received and the current internal state, the pipeline control produces the following information during each time period:

a) A boolean value ("FORCEVO" THROUGH "FORCEVN−2" for each processing element indicating that that processing element should "force vertically".

b) The boolean value "NEWSTREAMOUT" on line 200 indicating that the current record byte being output by the rebound sorter is the first byte of a new group of records being sorted. This is used by the sortorder checker to prevent comparison of records from different groups.

The pipeline control updates its internal state information every time the first byte of a record is presented to either the even or odd processing elements ("PCADV",every half record).

The "boundary" value enters the rebound sorter at the top, moves down the left side, across the bottom, and up the right side, in-parallel with the records.

The new "force vertically" value for PE "N" is set if any of the following is true:

"Boundary" is set for PE "N−1", or, for PEO, a "boundary" is entering the IERS("NEWSTREAMIN").

"Boundary" is set for PE "N".

"Force vertically" is set for PE "N+1". This does not apply to the last PE.

This operation causes all PEs at or above a boundary to "force vertically". It prevents mixing of records on different sides of a boundary, but allows records on the same side of a boundary to be sorted.

Sort secuencer 34 (FIG. 1)

As previously indicated, the sorter 18 with no internal boundaries can be thought of as a "magic sorting box", such that a record is pushed into the box, the smallest of all the records in the box (including the record pushed in) pops out.

The sorting and merging operations of the accelerator 10 will be best understood by recognizing and analyzing the problem of having N sorted strings of data to be merged into one large sorted string, using an N−1 element rebound sorter such as the sorter 18. Consider the following algorithm:

1) Set a boundary within the sorter 18 to start a new sort operation as described hereinabove in connection with FIG. 11.

2) Push the first (smallest) record of the first N−1 strings into the sorter 18.

3) Push the first (smallest) record of the N'th string into the sorter 18. The smallest of all the first records will pop out; this is the first (smallest) record of the merged string.

4) Identify the string from which the popped-out record came, and push the next record from that string into the sorter 18. The record that pops out is the smallest record remaining in any of the input strings, and thus is the next record of the merged/sorted string.

5) Keep repeating the previous step. When the last record of any input string pops out of the sorter 18, push in an artificial record (which is larger than any "real" record) as the "next" record of that string. When the first artificial record pops out of the sorter 18, the merge is complete, because no smaller (i.e. "real") records remain in the sorter 18.

The output of the sorter 18 when operated under this algorithm will be the merge of the N input strings; this can be proven by noting that:

a) Each record output from the sorter 18 is the smallest of all records currently in the sorter.

b) Since the record being output is replaced by the next record of the same input stream, which is not smaller than the output record since the input stream is sorted, the next record output from the sorter will not be smaller than the current record output from the sorter; i.e. the records output from the sorter are in sorted order.

c) All records of all input streams will eventually be output from the sorter.

In order to perform merges using the above algorithm, it is desirable to know which string a given record in the sorter came from. It is also desirable to know how to find the next record in that string and how to determine whether there are any remaining records in that string. The following sections set forth a preferred arrangement for obtaining and using the desired information. It should be noted that in place of artificial records, the invention uses the lowest numbered non-empty string until all strings are empty at which time NEWSTREAMIN is asserted.

Tag insertion and removal (FIG'S. 1 & 2)

The illustrated sort accelerator keeps track of which input string a given record in the sorter came from by using the byte inserter 25 of the input section 21 to insert a tag byte into each record as it is being fed into the sorter. As aforementioned in connection with FIG. 2, the tag byte is preferably inserted in a position immediately following the last byte of the key field and preceding the first byte of the data field. The tag byte of a record contains an index that describes which input string of this merge operation contained the record. An 8-bit tag byte would allow up to 256 strings to be input to a merge; actually, one bit of this byte is used to help implement and insure a stable sorting operation as hereinafter described, so that a maximum of 128 strings may be merged. The illustrated embodiment is limited to merging 16 strings at a time by the number of processing elements in the sorter (15), requiring only 4 bits for the string identification.

In an output operation in which a string of completely sorted records is output by the output section 22, for transfer to the host memory or for temporary storage in the local memory 16, the data packer 31 of the output section 22 removes the tags previously inserted by the input section 21 from the records as they are output from the sorter, so that the tags do not occupy any space in storage. As discussed hereinafter, the user may optionally specify that tags should be left in the records when the records are output to the user's buffer by the final merge pass.

As records are output from the sorter, the tag byte is examined to determine the input string from which the record came. This string number is fed into the string selection logic circuit 39 of the sort sequencer 34, and the sort sequencer 34 is controlled by microcode in ROM 38 to use the output of the string selection logic circuit 39, to determine the address of the next record to input to the sorter; that record address, along with the string number produced by the string selection logic circuit 39, is given to the input section 22 to start reading the next record.

String selection logic circuit 39 (FIG. 12)

In general, the string selected to provide the next input record is the same as the string whose index was in the tag of the current output record. The exception is when the prospective string is exhausted. The technique of using an artificial, large record in place of the next record from that string, used in the algorithm described hereinabove, works but is clumsy and time consuming; it is found that it is much more efficient (and just as correct) to pick any string that is not exhausted and input a record from that string (in order to preserve sort stability, now the lowest non-empty string must be selected). This operation is performed by the string selection logic circuit 39.

The string selection logic circuit 39 operates using a file of valid bits containing one bit for each input string and using circuitry to perform functions as now described. A portion of such circuitry is shown in FIG. 12 which is described hereinafter in connection with the operation of tag lookahead logic shown in FIGS. 13–17. The file of valid bits is set to all zeros at the beginning of a merge operation to show that none of the input strings has been exhausted. The tag from the output record indexes into the file of valid bits to see if the designated string is exhausted (i.e. the bit is a one); if not, that string number is output to the sort sequencer. If the designated string is exhausted a priority encode is performed on the file of valid bits to find the lowest-numbered string that is not exhausted, and the number of this string is sent to the sort sequencer. If all input strings are exhausted a flag is set which informs the sort sequencer of this fact.

The sort sequencer 34 contains two files of registers in the register array 35 to maintain the current state of a merge operation; one file contains a next record address for each string, and the other file contains the final record address in each string. Upon obtaining a string index from the string selection logic, the sort sequencer fetches the next record address for that string from the first file and sends it to the input section 21; it also updates the next record address for that string. When the address of the last record in a string has been sent to the input section 21 (as determined by comparing the next record address to the final record address for that string in the second register file), the sort sequencer sets the valid bit corresponding to that string in the string selection logic's bit file to indicate that the string is now exhausted.

The string selection logic circuit 39 is also used when the number of strings to be merged is less than 16. The algorithm presented above only works when the number of strings is one greater than the number of elements in the sorter. When there are fewer strings to be merged, a number of "null" strings (containing no records) must be added to the merge to bring the number of strings to the correct value. The string selection logic circuit 39 is used to insure that an attempt to initially load the sorter with a record from one of the "null" strings (as described in the first step of the algorithm described above) will actually cause a record from one of the "real" strings to be loaded. This is done by initializing the valid bit of the "null" strings to a one instead of a zero in the string selection logic circuit 39 at the beginning of a merge operation.

Tag lookahead and associated logic (FIGS. 12–17)

Even with specialized string selection logic and a fast sort sequencer, there is a delay between the output of the tag for the current record and the delivery of the address of the next input record to the Input Processor. The input section 21 must fetch the first bytes of the new record before they can be input to the sorter. This can add up to a noticeable delay between records, which causes the input section 21 to stall the sorter waiting for data and the merge process to slow down.

To eliminate this delay, the sort accelerator implements tag lookahead logic in order to determine the tag of the smallest record before it is actually output from the sorter.

The tag lookahead logic operates in conjunction with string selector logic which is shown in FIG. 12 and which is operative to select from among three possible values for the tag of the next record to be applied to the sorter 18. These three values are a "PEITAG" developed on a line 202 by logic circuitry of FIG. 17 in a manner as hereinafter described, the tag "ITAG" of an input record, applied on a line 203 and the tag of the lowest numbered stream with tags remaining, developed on a line 204 by a priority encoder 206 to which status data are applied through a line 207 (described hereinabove).

A multiplexer 208 is operated by a "PV0" control signal applied on a line 209 to develop a "WINTAG" signal on a line 210 from the "ITAG" and "PEITAG" signals. If "PV0" is true, "PEITAG" is selected; otherwise, "ITAG" is selected. Then the status of the "WINTAG" stream on line 210 is examined by a stream status lookup section 212 which develops an output signal on a line 213, applied to a multiplexer 214 to which the "WINTAG" and "ALTTAG" signals are applied. If the "WINTAG" stream is not empty, then "WINTAG" is used as "NEXTTAG" developed on an output line 216 of the multiplexer 214. Otherwise, the lowest numbered stream that is not empty ("ALTTAG") is used as "NEXTTAG" on line 216.

The tag lookahead logic circuit 100 includes circuitry shown in FIG. 13 which is used in developing the "PE1TAG" signal on line 202 and also a backup tag "BTAG" on a line 218; logic circuitry shown in FIG. 14 which is used in asserting a "DECISION" signal on a line 220 when PE0 has decided on the current record; logic circuitry shown in FIG. 15 for developing a "VALTAG" signal on a line 222 to validate a record exiting PE0; logic circuitry shown in FIG. 16 for developing a "ADVTAG" signal on a line 224 to advance a tag from the "BTAG" line 218 to the circuit of FIG. 15 to the "PE1TAG" line 202; and circuitry shown in FIG. 17 which develops a "TAGSEEN" signal on a line 226 when a tag has been found in the last half of a current record exiting PE0.

With respect to the operation of the tag lookahead logic circuits, it is noted that the record to be output from the sorter always comes from PE0. The inputs of PE0 are the record being input to the sorter and the output of IERS N−1, which is fed by the upper output of PE1. The tag of the input record is known; the tag of the record in PE1 is provided to the tag selection logic 39 by special logic in PE1 ("PE1TAG" on line 202 in FIGS. 12 and 13). The tag lookahead logic monitors the internal state of PE0 watching for a decision to be made ("DECISION" on line 220 in FIG. 14); when it is made, the "Pass Vertical" state bit for PE0 ("PV0" in FIG. 12) is examined to see which record will be the one to exit PE O. The tag of this record ("WINTAG" in FIG. 12) is then used as the input to the string selection logic (FIG. 12), thereby getting a jump of up to half of a record on the actual output. Using this technique the inter-record delay on merges can be totally eliminated except for very small records or when the "Decision" is made very late in the record.

The logic circuitry of FIG. 13 includes a multiplexer 228 which is operated by an inversion of the "ADVTAG" signal on line 224 from the circuit of FIG. 16 and which has one input connected to a latch circuit 229 which is connected to the output line 202. A second input of the multiplexer 228 is connected to the output of a multiplexer 230 which is operated by the "OTAG" signal on line 178 from the record control circuit 62B of FIG. 10.

One input of the multiplexer 230 is connected to a "UR1" on line 231 while a second input thereof is connected to the "BTAG" on line 218. Line 218 is connected to the output of a latch 232 which is driven from a multiplexer 234, controlled from the line 178 and having inputs connected to the lines 218 and 231.

The tag for the record exiting PE1 ("PE1TAG" on line 202 of FIG. 13), is extracted as follows: If not advancing tag ("−ADVTAG"), then the previous value of "PE1TAG" is latched. If advancing tag ("−ADVTAG") on line 224 is true and a tag is exiting PE1 ("OTAG" on line 178), then that tag is selected through ("UR1") on line 231. If a tag is advancing and a tag is not exiting PE1, then the backup tag ("BTAG" on line 218) is selected, the backup tag being latched by circuit 232 whenever a tag exits PE1 ("OTAG").

Referring to FIG. 14, the "DECISION" signal on line 220 is developed by an AND gate 236 which has one input connected to a "DECENB" line 237 and a second input connected to the output of an AND circuit 238 which has inputs connected to a "−DECIDING0" line 239 and to the "VALTAG" line 220 from the circuit of FIG. 15.

Referring to FIG. 15, the "VALTAG" signal on line 220 is developed at the output of a latch 240 coupled to the output of an OR circuit 242 having inputs connected to three AND gates 243, 244 and 245. The inputs of gates 243, 244 and 245 are connected to lines 220 and 226, to a "−EREC" line 246 derived from an inversion of the "EREC" line 160 of FIG. 9 and to other signals derived from the record control circuits of FIGS. 9 and 10, as described hereinabove.

The "VALTAG" signal on line 220 validates the tag for the record exiting PE1 ("PE1TAG") if it is the tag for the record exiting "PE0". "VALTAG" becomes deasserted whenever the last byte of a record exits PE0 ("−EREC" and "VALTAG"). If the tag is in the first half of the record, "VALTAG" becomes asserted when a record starts entering PE0 ("EREC" and "TAGSEEN"). If the tag is in the second half of the record, "VALTAG" becomes asserted as soon as the tag exits PE1 ("TCTR=0" and "TCNT" and "−RCNT").

With regard to the circuit of FIG. 16, the output line 224 is connected to a latch 250 which is connected to the output of an OR gate 252 having inputs connected to two AND gates, AND gate 253 having inputs connected to lines 160 and 226 and AND gate 254 having inputs connected to lines 146, 156 and 167 from the circuits of FIGS. 9 and 10.

A tag is advanced from "BTAG" to "PE1TAG" by "ADVTAG". If the tag is in the first half of the record, "ADVTAG" is asserted during the first byte of a record presented to PE0 ("EREC" and "TAGSEEN"). If the tag is in the second half of the record, "ADVTAG" is asserted while the tag is exiting PE1 ("TCTR=0" and "TCNT" and "−RCNT").

FIG. 17 shows logic which keeps track of whether the tag has been seen during the last half of the current record exiting PE0. It includes a latch 256 which is connected to the output of an AND gate 258 having one input connected to the "−EREC" line 246. The second input of gate 258 is connected to the output of an OR gate 259 having one input connected to the line 226 and having a second input connected to an AND gate 260 which has inputs connected to the lines 150 and 156 from the record control circuits of FIGS. 9 and 10. "TAGSEEN" on line 226 becomes deasserted whenever the last byte of a record exits PE0 ("−EREC"). "TAGSEEN" becomes asserted when the tag exits PE1 during the first half of a record ("TCTR=0" and "TCNT" and "RCNT").

Sort sequencer 34 (FIGS. 1 & 18–22)

Whereas the other areas of the sort accelerator operate on the data strings to be processed, the sort sequencer calculates the external memory addresses and provides overall control of the sort accelerator.

The illustrated preferred embodiment of a sort accelerator uses the 16-way enhanced rebound sorter 18 as shown, but the following sections have been generalized to the use of an N-way sorter having functional characteristics equivalent to those of the sorter 18 as disclosed.

As aforementioned, the sort sequencer 34 has a control processor which includes the register array 36 and the flag register 37. The register array 36 may preferably be an array of 64 32-bit registers in four banks and the flag register may be a 32 bit register. The control processor also includes the ALU 37 which is preferably a 32-bit ALU. In a practical embodiment, this architecture is capable of reading one register, performing an ALU operation, and writing the same register in one 133ns clock.

The register array serves two purposes. The host processor communicates control information to the sort accelerator by initializing these registers, and the control processor uses them as the variables of its microcoded program. Addresses, counts, and status information are maintained in the array. The array is organized as four banks of 16 registers each. Each bank may be indexed with a variable, allowing the tag from merge operations to be quickly translated from a string index into an address pointing to the next record to be fetched.

Figures 18, 19, 20, 21, 22:
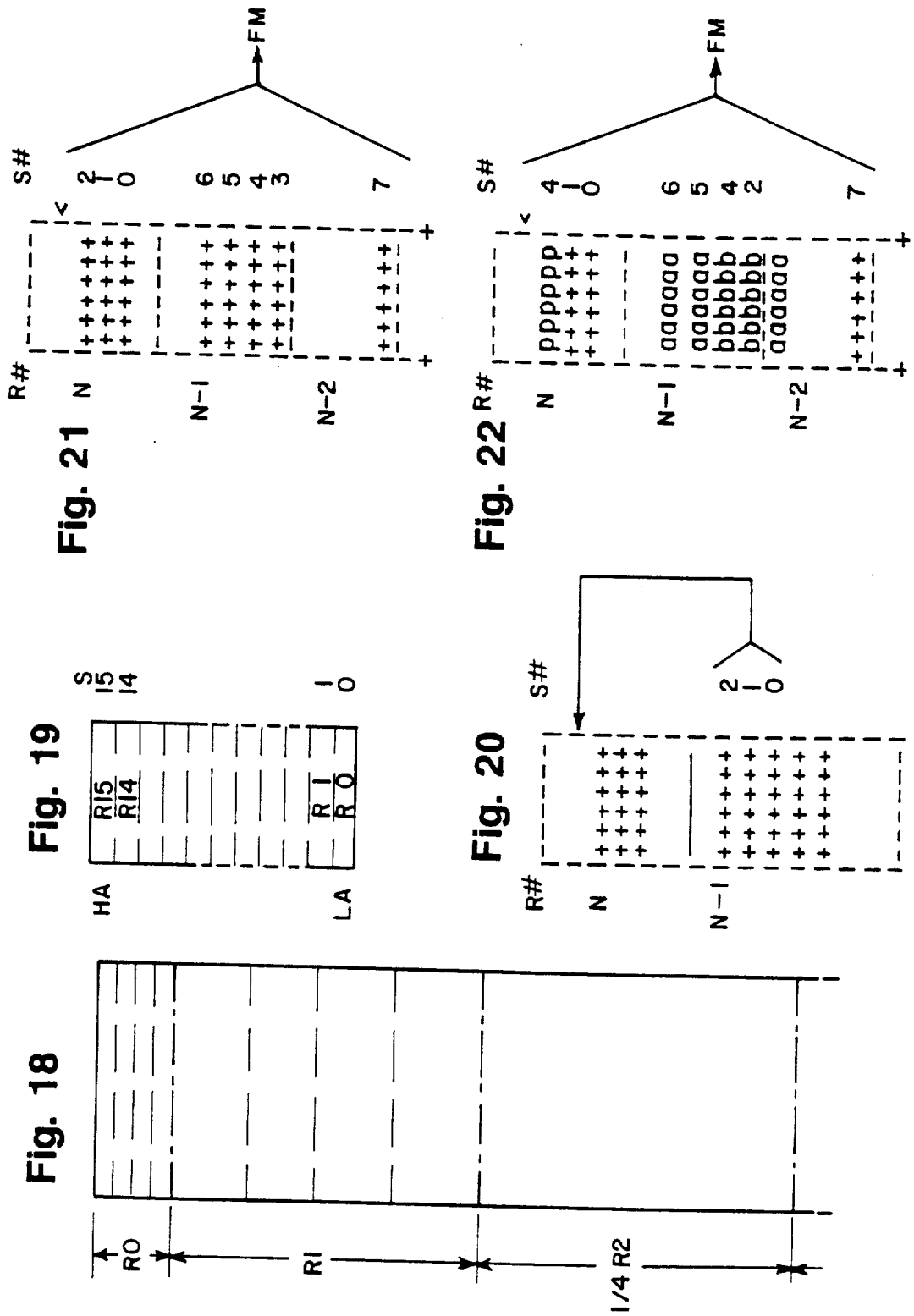
FIG. 18 provides an illustrative example of an organization of intermediate storage which is used by the sort accelerator of FIG. 1.
FIGS. 19 to 22 together illustrate string number assignments used for obtaining optimal merging operations.

A microprogram for the control processor is stored in the ROM 38 in an array which may, for example, consist of 512 microwords of 60 bits, each microword being divided up into fields controlling the source of ALU operands, the ALU operation to be performed, the destination of ALU operations, and the location of the next microword to be executed. Additional fields in the microword may enable the writing of data to various destinations and control the flow of microprogram execution and microcode subroutines may be supported. It will be understood that the invention is not limited to the use of any particular form of control processor for performing the sorting operations as hereinafter described in detail and as depicted in part in FIGS. 18-22. FIG. 18 illustrates the organization of intermediate storage which is important to an understanding of the operation of the sort sequencer and FIGS. 19-22 illustrate sort sequencer modifications which are important in achieving sort stability.

Organization of intermediate storage (FIG. 18)

The algorithm used by the sort accelerator 10 requires intermediate storage which is organized into regions of different sizes. The smallest region is located at the base of the intermediate storage area and is used to hold up to N strings of N records. The second region is located at the end of the first region and is used to hold up to N strings of $N \times N$ records. Each successive region is larger than its predecessor by a factor of N. FIG. 18 provides an illustrative example of the organization which would apply if N were 4, rather than 16 as in the illustrated embodiment. In this example, the first region, indicated by R0, stores four records, the second region, indicated by R1, stores four strings of sixteen records, i.e. it stores $N \times N$ records. The third region, indicated by R2, with only one-fourth being shown stores four strings of sixty-four records, i.e. it stores $N \times N \times N$ records.

In the illustrated embodiment in which N is sixteen, the first region R0 stores sixteen strings of sixteen records (256 records), the second region R1 stores 4096 records and the third region R2 stores 65,536 records. Subsequent regions contain 16 times the number of records in the preceding region. Any number of additional regions may be provided depending upon the available memory.

The location and size of the intermediate storage is programmed by loading the base address and end address of storage in the register array at operation initialization. If insufficient storage is allocated for an operation, the control processor will suspend the operation and interrupt the host processor. The storage can be dynamically expended by increasing the end address.

Extended merge-sort algorithm

In the illustrated embodiment, an extended merge-sort alogrithm is embedded in the microprogram stored in the ROM 38, but any equivalent means for implementing the algorithm may be used. The algorithm utilizes the N-way merge capabilities of the enhanced rebound sorter to reorder an unlimited number of records. The algorithm consists of two phases called the input phase and the output phase. As will be discussed below, the sequence of sorts and merges which make up these phases is important for sort stability, memory efficiency, and performance.

Input Phase

The input phase, consisting of sorts and merges, is in effect until all of the unsorted records that make up the input string have been processed. Each sort operates on N unordered records, creating a sorted string of N records in region 0 of intermediate storage. Each merge operates on the N sorted strings of a filled region, creating a single sorted string in the next region N times larger than each of the input strings.

The input phase begins by sorting the first N records from the input string into one string of N records in region 0. The next N records from the input string are then sorted into a second string of N records. This process continues until N strings of N records exist in region 0, at which point the sorting is suspended while they are merged into a single string of $N \times N$ records in region 1.

Once this "merge-up" is complete, the input phase resumes sorting the input string. Eventually, N new strings of N records are created in region 0, sorting is suspended, and they are merged into a second string of $N \times N$ records in region 1. This process continues until there are N $N \times N$-lengthed strings in region 1, at which point they are merged into a single string of $N \times N \times N$ recorded in region 2. The number of regions is limited by the amount of intermediate storage available.

The input phase continues, performing a "merge-up" whenever possible, until the entire input string is processed. The number of records in the input string is programmed into the register array when the operation is initialized. There are several option bits in the command register, one of which indicates whether or not the input string contains all of the records to be sorted. If this bit, the END bit, is not set, the control processor will interrupt the host processor before the output phase begins, allowing the host processor to include another input string in the same sort operation. The record count register is continually decremented as the input string is processed.

Output phase

At the completion of the input phase, there will be a number of strings existing in multiple regions. The output phase consists of a series of merges to reduce this number to N or less, and a final merge directly to the destination address.

At the beginning of the output phase, there will be up to N—1 full lengthed strings in each region plus a partial string in region 0. The partial string consists of the total number of records being sorted module N (possibly 0) which exists because the total number of records need not be a multiple of N. For sort stability purposes, priority is assigned from highest region to lowest. Within one region, priority is lowest string to highest. This coincides with the order the strings were created.

The output phase proceeds in a very efficient and reliable manner. Starting with the lowest nonempty region, a merge is performed which includes as many regions as possible with the restriction that the total number of strings involved is less than or equal to N. This merge creates a new partial string in the first nonempty region not included in the merge.

These multi-region merges continue until the second highest region is reached. At this point, if both second highest and highest regions can be included, then they will participate in the final merge of the sort operation which is written to the destination location. If the highest region can not be included, then the second highest region is prohibited from participating, with the output creating a partial merge at the second highest level.

The later case represents a performance optimization. Because the size of strings in the last two regions are significant with respect to the size of the entire sort operation, the manipulation of these strings is minimized by merging just enough strings from the second highest region into a partial string at the highest region to leave exactly N strings. This is called the "optimal" merge. The N strings then participate in the final merge.

Throughout the entire sort operation, the string count of each region is maintained in one bank of the register array to allow indexing. The length of the partial string is maintained in another register in the array. The lengths of the other strings are known from their region numbers.

Because there is only one register to maintain partial string lengths, only one partial string can exist at any time. The output phase includes the partial string in every merge, and each of these merges creates a larger partial string in a higher region. The partial string length register is continually updated to reflect the size of the new partial string. The partial string also participates in the "optimal" merge.

Management of Intermediate Storage

The organization of intermediate storage is described above in connection with FIG. 18. This section details the bookkeeping performed by the control processor during the input phase of a sort operation.

The control processor needs to determine if enough storage has been allocated for the operation. To do this with minimal performance degradation, two registers in the register array 35 are used to maintain the highest active region number and the highest active address. At the beginning of each sort or merge within the extended merge-sort algorithm, the current region is compared to the highest active region. If it is less than the highest active region minus 1, then the sort or merge continues normally; otherwise, the control processor is about to create a new string in the highest region and needs to verify that enough storage has been allocated to proceed.

The verification begins by using the highest active address register to determine if there is room for another full string in the next region. If there is, then the extended merge-sort proceeds normally; otherwise, the control processor determines how many strings from the current region will fit into a partial string at the next region, and uses that information to determine how many additional records could be processed if these strings were merged. If this number is less than the number of records remaining in the input string, then the control processor interrupts the host processor indicating that more storage must be allocated to finish the operation.

If the number of additional records allowable is greater than the number of records remaining, then the operation can be finished without additional storage. If the END bit in the command register is set, then the control processor merges up just enough strings from this level such that the number of remaining strings in this level plus the number of additional strings in this level which will be formed from future input plus the number of strings in the next level is identically N. A flag is set which will indicate to the output phase that an "optimal" merge has been performed, and the length of this special partial string is saved in a register in the register array. This register is not the same as the partial string length register used by the output phase.

If the END bit is not set, then an additional option bit in the command register, the LOCK bit, is examined. If the LOCK bit is set, then the control processor merges as many strings as possible into the special partial string at the next level, sets the merge flag, saves the length of the special partial string, and continues creating strings at level 0. If the LOCK bit is not set, then the host processor is interrupted allowing it to set the END bit, set the LOCK bit, or increase the storage end address.

The "optimal" merge guarantees that the performance of the extended merge-sort is optimized. The "compaction" merge occurs because the control processor does not know the total number of records in the operation and the host processor has given permission to lock the size of the intermediate storage. Once locked, it is illegal to increase the end of storage address. This merge optimizes the number of records that can be sorted with the given amount of storage.

Sort control

The sorting process of the input phase as described hereinbefore requires that the sort accelerator read in N unordered records from the input string, sort them, and place the results in a new string in region 0 of intermediate storage.

The sort control may preferably exist within a single loop in the microcode. First, the record count register is checked to see if the input string has been exhausted. Once it is, control is passed to the output phase. If there are more input records, the source address in the register array is passed to the Input Processor. This register, which was loaded with the address of the input string when the operation was initialized, is then incremented by the number of bytes per record. Another count register in the array is incremented by one, and the sort loop continues until the count reaches N.

Merge Control

Unlike the sort control which may preferably be handled purely in microcode, the microcode for the merge control is preferably accelerated with the string selection circuit 39, using the merge algorithm as described hereinbefore. The string selection logic is also described hereinabove. The sort sequencer is also responsible for supplying the tag which the Input Processor inserts into each record.

Sort Stability

A "stable" sort is one in which records with equal keys exit the sort in the same relative order as that in which they entered. To keep the design simple, and reduce the additional storage and time requirements, use is made of the tag byte already required by the N-way merge algorithm, to insure sort stability. This feature keeps the total record size relatively small and does not require extensive changes to the sort sequencer or the rebound sorter.

To ensure that this predetermined order is not changed, several features are included in the sort accelerator 10, using special hardware and algorithms.

As has been described, a tag byte is inserted into the input record stream following the key bytes, but preceding the remaining data bytes. The high order 4 bits of the tag byte are set to the string number from which the record came (for a merge), or zero (for a sort).

The tag byte is always compared in the processing elements in "ascending" order. Placing the tag byte after the key, but before the remaining data allows the processing elements to decide which way to pass the remaining non-key bytes before those bytes are presented. The string number will cause records from different strings with equal keys to exit the rebound sorter in the order in which they entered. The "order" bit will cause records from the same string with equal keys to exit the rebound sorter in the order in which they entered.

Sort sequencer enhancements

For a given merge, strings of records are selected that entered the sorting process together. That is to say, there are no records not selected that entered the sorting process before some records that are selected, but after others that are selected (they could potentially belong in this merge).

A unique number is selected for each string which indicates the relative order in which the records in that string entered the sorting process with regard to the other strings within the same merge. Each record of a string has the string number inserted into the high order bits of the tag byte. If the order of 2 records from different strings has not been resolved when their tag bytes are compared, the string number will insure that they exit from the merge in the same order that they entered.

As sorted strings are written into a region of workspace, they are written into the lowest available row in that region. Whenever a region becomes full, it is merged up into the lowest available row in the next higher region. From this you can see that in the absence of a partial merge (described below), the highest region contains the strings that entered the sort first, the second highest region second, and so on. Within a region, the lowest row contains the string that entered the sort first, the next row second, and so on.

In the descriptions below, string numbers are assigned sequentially starting with 0. Unless otherwise specified, within a group of rows the string numbers are assigned sequentially from the lowest to the highest row. As shown in FIG. 19, string numbers 0 through 15, in the column under "S" are in sequential order, string 15 being at the highest address "HA" and string 0 being at the lowest address "LA".

There are 4 different cases for assigning string numbers to the strings involved in a merge:

1) When a region is filled and a full merge to the next higher region is performed, the string numbers are assigned as a group to the 16 rows (as in FIG. 19).

2) When a partial merge is performed due to a restricted amount of workspace, not all rows of the second highest region are merged up into the highest region. In this case, string numbers are assigned as a group to as many of the highest numbered rows of the second highest region that will fit in the last row of the highest region. In the example of FIG. 20, "N" is the highest region number.

3) When the final merge (after all input data is located in the workspace memory) is done, and no partial merge has occurred, string numbers are assigned as a group to all rows in the highest region, then all rows in the second highest region, and so on until all non-empty regions have been assigned. This condition is depicted in FIG. 21 in which the final merge is indicated by "FM".

4) When the final merge is done, and a partial merge has occurred, the procedure is more complicated. It should first be pointed out that:
  a) Only 1 partial merge will ever be done.
  b) It will always be from the second highest region to the highest region.
  c) No more merges will be done into the highest region (it is full).

The following procedure is followed. First, string numbers are assigned as a group to all but the last row of the highest region. Then they are assigned as a group to the rows in the second highest region that remained immediately following the partial merge. Next the last row of the highest region is assigned a string number. Then the remaining unassigned rows in the second highest region are assigned as a group. Finally, any remaining non-empty regions are assigned as a group in descending order of region.

In FIG. 22, which shows the string number assignment for an optimal merge after a partial merge, data is represented as follows:

"pppppp" = result of the partial merge.

"aaaaaa" = rows added to second highest region after the partial merge.

"bbbbbb" = rows remaining in second highest region immediately following the partial merge.

"++++++" = other filled rows.

Rebound sorter enhancements

The least significant bit of the tag byte (called the "order" bit) of each record entering the sorter is set to 1.

The order bit is used to preserve the order of records with the same string number. The order bit is manipulated as follows (remember it enters the rebound sorter set to 1):

a) If the processing element decides to pass vertically or is already passing vertically:
  1) The tag byte passed "down" (the one that was coming down) has its order bit set to 1.
  2) The tag byte passed "up" (the one that was coming up) has its order bit passed unchanged.

b) If the processing element decides to pass horizontally or is already passing horizontally:
  1) The tag byte passed "down" (the one that was coming up) has its order bit set to 0.
  2) The tag byte passed "up" (the one that was coming down) has its order bit set to 1.

c) The tag byte passed from IERS "N−2" to IERS "N−2+N−1" has its order bit set to 1.

The stability of this method is shown by an example in which it is assumed that there are 2 duplicate records. For this discussion, we will assume that duplicate records are ones with completely equal keys and equal tags.

The first record enters the ERS and mixes with other records until the second record enters the ERS. In order to meet the second record, the first record must turn up, getting its order bit set to 1. Since the ERS is sorted, the second record will proceed straight down to meet the first one, keeping its order bit set. The 2 records will compare exactly equal, including the order bits, and thus will continue to pass vertically. In the absence of additional duplicate records, the duplicate records will continue up to pass larger records, or the top one will turn down (which clears its order bit) and meet the next duplicate record coming up (which still has its order bit set). This will cause them to preserve their current positions in the ERS until either passed by a larger record, another duplicate enters, or the ERS is flushed.

Now it is only necessary to show is that a new record entering an existing group of duplicates will fall to the bottom of the group. As the new record encounters each record in the existing group of duplicates, the new one is coming down and the old one is coming up. A record coming up always has its order bit set. A record coming down being passed vertically always has its order bit set as well. This means that the new record will continue to pass vertically down the column until it reaches the bottom of the group.

From the above it can be concluded that the rules can be changed to leave the order bits unchanged when passing vertically. This would allow records turned down to keep their order bits set to 0 if they continue to go down, but a record which is turned down never continues down since everything below it is larger than it. This would simplify the logic in the PEs.

By the indicated use of the order bit, records that might exchange position are forced to preserve their initial order.

Data integrity features

In cooperation with external hardware, data passing through the sort accelerator is checked for corruption from the point where data enters the device until it exits. In addition, when sorting or merging records, the order of output records is checked to ensure proper operation of the sort accelerator device and proper input record ordering for merges.

Error detection code

Parity

Data paths outside of the sorter are checked using byte parity. Byte parity is a scheme where 8 bits of data are represented by a 9 bit value. The extra bit carries a parity value, calculated at the source of the data. Parity checking is accomplished by re-calculating the parity value from the data and comparing the newly calculated value with the parity bit. An inequality indicates an error in the data.

The sort accelerator 10 is supplied with data and parity from the host system. As data enters, the parity is preferably checked. A error detected at this point is classified as a system parity error, and will be reported as such.

Parity protection of the data path from the system bus interface continues to the rebound sorter. As data enters the rebound sorter, data parity is again checked, with errors reported as internal data errors.

On output, the rebound sorter generates data with parity. When this data reaches the system bus interface, its parity is checked, with discrepancies reported as an internal parity error. The parity value is regenerated at the system bus interface and passed with the data to the host system, allowing the host to check data parity as desired (parity is regenerated at the system bus interface to provide parity for data from the sort sequencer).

Figure 23:
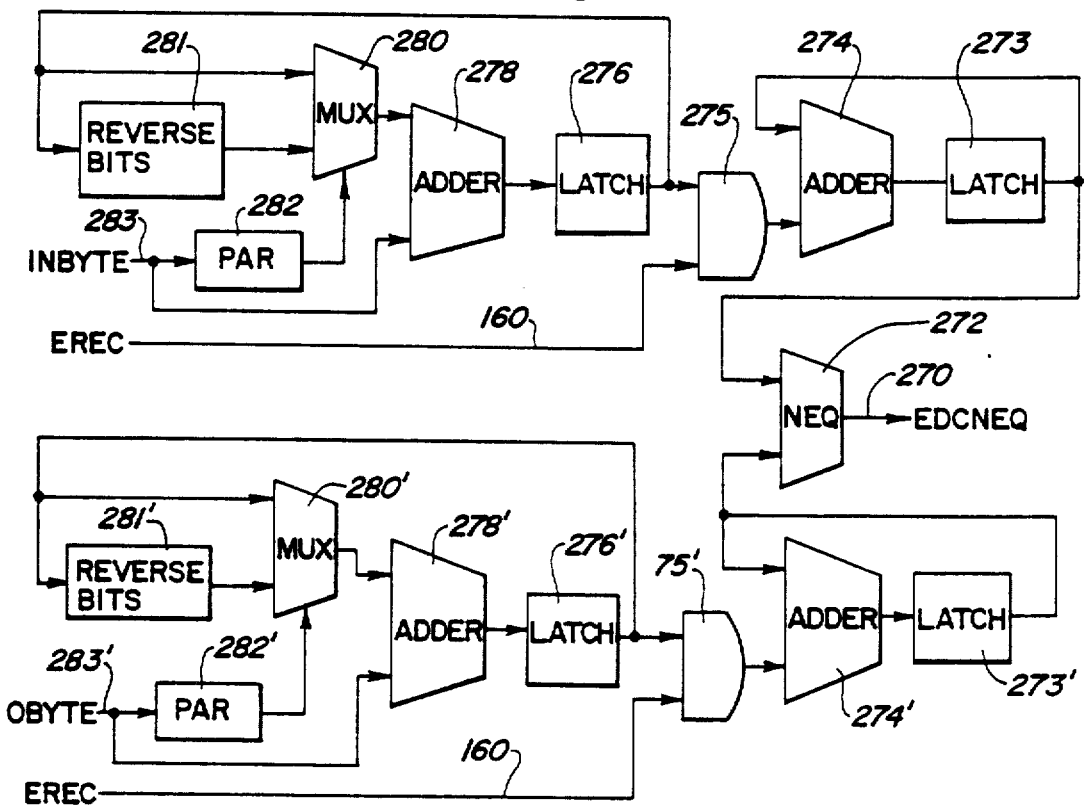
FIG. 23 shows checksum logic circuitry of an interface of the enhanced rebound sorter of FIG. 1.

Checksums calculation (FIG. 23)

Within the sort accelerator, data integrity is ensured by using a two level checksum scheme. Checksum protection is a method of error detection where a checksum is calculated over multiple bytes. The checksum is later checked by re-calculating the checksum and comparing it to the previously calculated checksum. A checksum is calculated using the following formula:

$$\text{for } i = 0 \text{ to } n, \text{ checksum} = f(\text{checksum}, \text{data}[i])$$

As each record enters the sorter, a record checksum is calculated. The function (f) for this checksum uses the parity of the data byte, using a "PAR" block as hereinafter described in connection with FIG. 23, to select either the checksum or a bit reversed version of the checksum to be added modulo 256 to the data byte. A "REVERSE BITS" operation is performed on a byte which swaps the most and least significant bits within the byte, the next most and least significant bits and so on, so that all bits have a different position.

These record checksums are added together modulo 256 to create a checksum over a group of records.

Records exiting the sorter have checksums similarly calculated. The input and output checksums are then compared after the sorter has processed a group of records and has the remaining records flushed.

The simple summing of record checksums creates a function with associative properties: the order the record checksums are summed have no effect on the resulting checksum. This is important as the primary function of the sorter is to reorder records.

The calculation of the Record Checksum is not associative.

If byte n of two records are swapped between the two records, the sum of the two record checksums will be different.

An example of a swapped bytes is as follows:

| | Record A | | | Record B | | | Sum of |
|---|---|---|---|---|---|---|---|
| data | par | checksum | data | par | checksum | Rec. |
| Input: cksums | | | | | | | |
| 0 × 61 | 0 | 0 × 61 | 0 × 31 | 0 | 0 × 31 | | |
| 0 × 62 | 0 | 0 × C3 | 0 × 32 | 0 | 0 × 63 | | |
| 0 × 63 | 1 | 0 × 26 | 0 × 33 | 1 | 0 × F9 | 0 × 15 |
| Output: cksums | | | | | | | |
| 0 × 61 | 0 | 0 × 61 | 0 × 31 | 0 | 0 × 31 | | |
| 0 × 32 | 0 | 0 × 92 | 0 × 62 | 0 | 0 × 93 | | |
| 0 × 63 | 1 | 0 × 2C | 0 × 33 | 1 | 0 × FC | 0 × 28 |

This checksumming scheme can check for two types of errors in the sorter 18: single bit failure in the data path (including storage element failure) and the improperly controlled swapping of bytes between records (PE control failure).

The checksum operation is implemented using logic circuitry of FIG. 23 which develops a "EDCNEQ" signal on a line 270 which is connected to the output of a "NEQ" comparison circuit 272 which compares the output of two sections. An upper section as shown in FIG. 23 includes an output latch 273 which is connected to the output of an adder circuit 274, one input of the adder circuit 274 being connected to the output of the latch 273.

The other input of the adder circuit 274 is connected to the output of an AND circuit 275 which has one input connected to the "EREC" line 160. The other input of the AND circuit 275 is connected to the output of a latch 276 which is connected to the output of an adder circuit 278. One input of the adder circuit 278 is connected to the output of a multiplexer 280 which has one input connected to the output of the latch 276 and which has a second input connected to a "REVERSE BITS" block 281. Block 281 performs the aforementioned bit reversal of a byte.

The multiplexer 280 is controlled by a "PAR" block 282, the input of which is connected to a "IBYTE" line 283 (bytes entering the rebound sorter) the "IBYTE" being also connected to a second input of the adder 278. The second lower section of the logic is substantially identical to the first, corresponding elements being indicated by primed numbers. The difference is that the line 283' is an "OBYTE" line (bytes exiting the rebound sorter) whereas the line 283 is an "IBYTE" line.

Sort order checker (FIGS. 24–28)

As records exit the sorter, they enter a special storage element which holds one record. This storage element behaves like a shift register, allowing comparison logic examining the input and output of the storage element to verify that records leaving the sorter are properly ordered. The comparison logic is similar to the processing elements used in the sorter with the exception of the output. The output of the comparison logic is a signal which indicates that a decreasing (increasing for "descending"60 sorts) sequence of records has been detected (a sort order error).

The sort order checker is also used to provide a "tie" bit indicating that a record in the output string has the same key as the following record. The "tie" bit is the least significant bit of the tag byte on output from the rebound sorter. User software can utilize this "tie" bit to perform sorts on key fields which exceed the capacity of the accelerator 10, as described in a subsequent section, or to aid in post-sort processing of duplicate records. The sort Accelerator usually strips the tag byte from records before outputting them, but it can be instructed to leave the tag bytes in the records if the user wishes.

Figure 25:
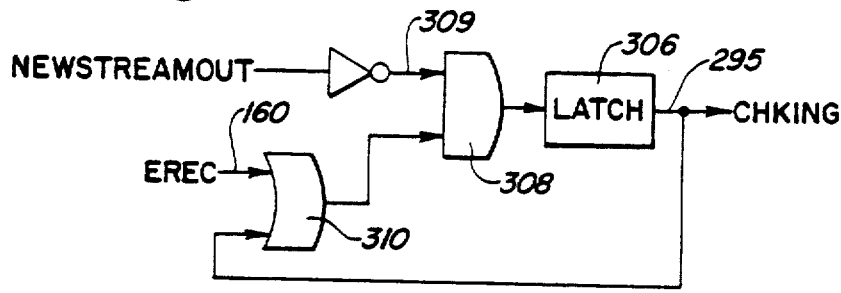
Figure 26:
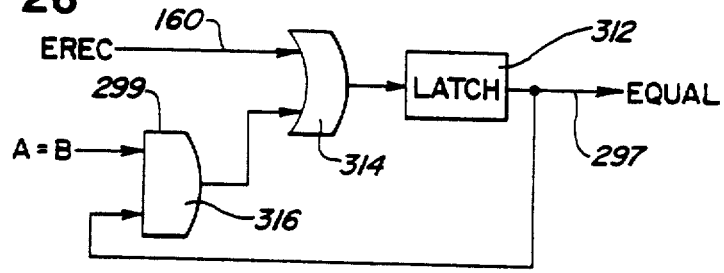
Figure 27:
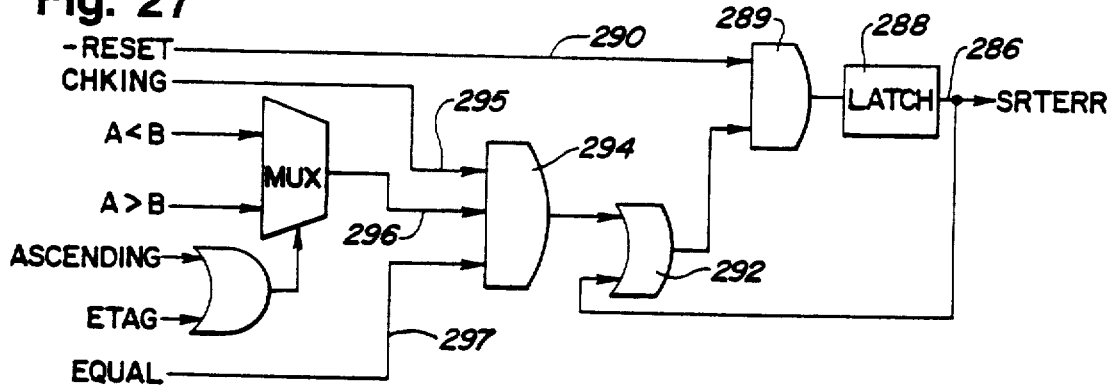

The sort order checking operations are implemented by logic circuitry shown in FIGS. 24–28. Circuitry as shown in FIG. 27 includes an output line 286 on which the aforementioned "SRTERR" signal is developed. Line 286 is connected to the output of a latch 288 which is coupled to the output of an AND gate 289 having one input connected to a "−RESET" line 290. The other input of AND gate 289 is connected to the other input of an OR gate 282 which has one input connected to a line 286 and a second input connected to an AND gate 294. AND gate 294 has inputs connected to lines 295 and 297 which respectively receive "CHKING", and "EQUAL" signals. The third input to AND gate 294 is connected to a multiplexer. One input of the multiplexer is "A<B", the other is "A>B". The multiplexer is controlled by an OR gate whose inputs are ASCENDING and ETAG.

Figure 24:
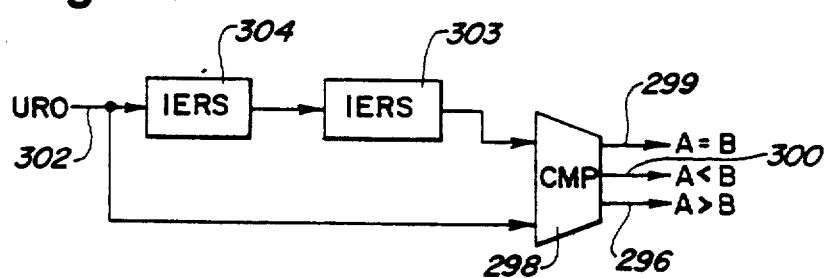
FIGS. 24 through 27 in combination show portions of logic circuitry of a sort order checker of the interface of the enhanced rebound sorter of FIG. 1.

The circuit of the sort order checker further includes logic circuitry as shown in FIGS. 24, 25, 26 and 28. In FIG. 24, a comparator circuit 298 is provided which develops the aforementioned "B<A" signal on the line 296 and also develops "A=B" and "A<B" signals on lines 299 and 300. One input of the comparator 298 is connected directly to a "UR0" line 302 while the other input of comparator 298 is connected to the line 302 through two cascaded IERS elements 303 and 304. These form the aforementioned special storage element which holds one record block.

In FIG. 25, the "CHKING" signal on line 295 is developed by a latch 306 which is connected to the output of an AND gate 308 having one input to which a "−NEWSTREAMOUT" signal is applied on a line 309, the "−NEWSTREAMOUT" signal being the inverse of the "NEWSTREAMOUT" signal developed by the pipeline circuitry shown in FIG. 11. A second input of the gate 308 is connected to the output of an OR gate 310 having one input connected to the "EREC" line 160 and having a second input connected to the line 295.

In FIG. 26, the "EQUAL" signal on line 297 is developed at the output of a latch 312 which is connected to the output of an OR gate 314 having one input connected to the "EREC" line 160 and having a second input connected to the output of an AND gate 316. One input of the AND gate 316 is connected to the "A=B" line 299 (FIG. 24) while the other is connected to the line 297.

Figure 28:
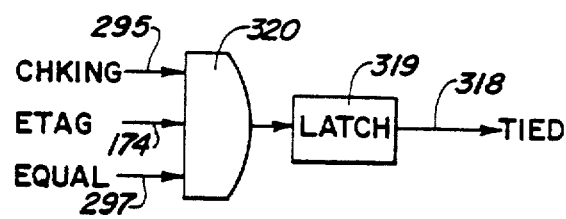
FIG. 28 shows an additional portion of logic circuitry of the sort order checker, used for generating a signal indicating that two consecutive records have the same keys.

FIG. 28 shows the circuitry used to develop the "TIED" signal which is developed on a line 318 connected to the output of a latch circuit 319 which is connected to the output of an AND gate 320 having inputs connected to the "CHKING" line 295, the "ETAG" line 174 from the circuit of FIG. 10 and the "EQUAL" line 297.

Exceeding the sort accelerator capacity

The accelerator 10 may be used even when the available workspace memory is not enough to sort records in a user's file. Algorithms are provided for dealing with two very common cases. The first case is when not enough workspace memory is available to sort the total number of records. The second case is when the record and/or key length exceeds the maximum allowed by the sort accelerator.

Exceeding the available workspace memory

When there is not enough workspace memory available to sort the user records, the user may use what is called an "external merge." This merely means that the user must manage the record storage for the input and output of each merge pass required to complete the sort operation.

To begin with, the user uses the sort accelerator 10 to sort as many records as will fit in the available workspace. It is not necessary to compute this number. Records are simply fed to the sort accelerator until an indication is provided that it is full. Each of these sorted strings of records must then be placed in storage available to the user (they may be written to disk, for example). When all of the records have been sorted, or 16 sorted strings have been created, the user then merges the sorted strings using the sort accelerator 10 as a merger. This can be done with buffered input and output, and thus requires that very little memory be available to the sort accelerator. The sorted string resulting from this merge can again be placed in storage. This algorithm can be used iteratively, limited only by the availability of additional record storage.

Exceeding the Maximum Record Length

There are 2 cases where the record length exceeds the maximum allowed by the sort accelerator.

The first, and simplest, case is when the total record is too large, but the key plus a pointer to the original record will fit. In this case, new records are input to the sort accelerator made up of the original key followed by bytes containing a pointer to the original record. When the sort has been completed, the user merely processes the sorted records, using the pointer to access the original record contents.

The second case occurs when the record is too large, and the key plus a pointer to the original record will not fit. In this case, the user again inputs new records, but this time the user only puts in as many key bytes as will fit, leaving room for the pointer at the end. When sorting with these truncated keys, a request may preferably be that the tag byte be output so the user can examine the "tie" bits.

In many cases, the truncated keys thus presented will be unique enough to determine the sorted order of the records. It is merely necessary to examine the "tie" bits to locate groups of records with duplicate truncated keys. This group of records can then be further sorted by using as the new key, as many of the remaining key bytes from the original record as will fit. This process may be iterated on all groups of records with duplicate truncated keys until there are no duplicate keys reported, or all key bytes have been processed.

It should be pointed out that this process can potentially run faster than using a sort accelerator with a larger maximum record size. This is because the speed of the Sort Accelerator is proportional to R * N * LOG16(N) where R is the record length presented to the Sort Accelerator, and N is the number of records. By using a smaller value of R (as restricted by the maximum R), the first pass sort of the records runs faster. Subsequent passes (if any) will very likely use a much smaller value of N to resolve any duplicates, which will be much faster.

It will be understood that modifications and variations may be effected without departing from the spirit and scope of the novel concepts of the invention.

What is claimed is:

1. A merging system for arranging a plurality of groups of unordered records into a string of sorted records comprising:

input means for receiving a plurality of groups of unordered records, each of the plurality of groups of unordered records having N records;

sorting means for receiving each of the plurality of groups of unordered records and for arranging the records of each of the plurality of groups of unordered records into a string of records in sorted order, said sorting means having a single input means for receiving records and a single output means for outputting records in sorted order, said sorting means further including a plurality of processing element means for comparing record data, a first processing element means coupled to said single input means and to said single output means of said sorting means, and the remaining processing element means connected in cascade relation following said first processing element means to a last processing element means;

first storage means coupled to said processing element means for storing the record data compared by said processing element means, said first storage means having first and second storage portions coupled to each of said processing element means, each of said processing element means having input means for receiving record data, said input means having an upper left input and a lower right input and output means for outputting record data, said output means having an upper right output and a lower left output, and processing element control means for controlling said process element means to operate in a first mode to effect transfers of record data from said upper left input to said lower left output and from said lower right input to said right output and to operate in a second mode to transfer record data from said upper left input to said upper right output and from said lower right input to said lower left output;

second storage means for receiving said strings of sorted records from said sorting means;

control means connected to said input means, said sorting means and said second storage means;

said control means operating in an initial mode to sequentially input said unordered records from each of said groups from said input means to said sorting means and coupled to said processing element control means for controlling the movement of the data from said first processing element means to said last processing element means and for storing said strings of sorted records in second storage means;

said control means thereafter operating in a merge mode to input said sorted records from said strings of sorted records to said sorting means and to sort said ordered records from said strings into another string comprising all of said records of said strings in sorted order and to store said another string in said second storage means;

said control means having a sort sequencer means for operating in said merge mode to input said records of said strings of sorted records to said sorting means in order so that the smallest record of each of said strings of sorted records is initially supplied to said sorting means and then after each record is outputted from said sorting means, the next input to said sorting means is the smallest of any remaining records in the same string as the last said outputted record and when the last said outputted record is also the last record in one of said strings then the next record input to said sorting means is any remaining record in said strings and then after each record is outputted from said sorting means, the next record input to said sorting means is the smallest of any remaining records in the same string as the last said outputted record and then after the last record of said strings is input to said sorting means the next records input to said sorting means are artificial records larger than any of said records from said strings and when the first one of said artificial records is outputted from said sorting means ceasing the inputting of said artificial records.

2. A computer implemented method for use in a merging system to arrange an unlimited number of unordered records into a single spring of sorted records, said merging system having a rebound sorter with N−1 processing elements and a storage means divided into a plurality of regions of different capacities, comprising the steps of:

(a) receiving an unlimited number of unordered records;

(b) arranging at least some of said unlimited number of unordered records into at most N groups of N records;

(c) receiving at said sorter for sorting N−1 records of one group of N records and after receipt of the Nth record of said one group providing as an output the smallest record of said one group of N records and then providing as an output the remaining N−1 records of said one group to form a sorted string of N records;

(d) repeating the receipt and sorting of said at most N groups of N records until N string of N sorted records are formed;

(e) storing said N string of N sorted records in the smallest capacity region of said storage means;

(d) suspending said sorting of said unordered records by said sorter;

(g) merging through said sorter said N strings of N sorted records to form a string of N×N sorted records by inputting said records of said N strings of sorted records to said sorting means in order so that the smallest record of each of said N strings of sorted record is initially supplied to said sorting means and then after each record is outputted from said sorting means the next to said sorting means is the smallest of any remaining records in the same string as the last said outputted record and when the last said outputted record is also the last record in one of said strings then the next record input to said sorting means is any remaining record in said strings and then after each record is outputted from said sorting means, the next record input to said sorting means is the smallest of any remaining records in the same string as the last said outputted record and then after the last record of said strings is input to said sorting means the next records input to said sorting means are artificial records larger than any of said records from said strings and then after the next N−1 records have been outputted from said sorting means ceasing the inputting of said artificial records.

(h) storing said string of N×N sorted records in a second region larger in capacity than said smaller region of said storage means;

(i) repeating steps (b) through (h) until there are N N×N strings of sorted records in said second region of said storage means;

(j) merging through said sorter said N strings of N×N sorted records into a string of N N×N sorted records by inputting said records of said N strings of sorted records to said sorted means in order so that the smallest record of each of said N strings of sorted records in initially supplied to said sorting means and then after each record is outputted from said sorting means the next input to said sorting means is the smallest of any remaining records in the same string as the last said outputted record and when the last said outputted record is also the last record in one of said strings then the next record input to said sorting means is any remaining record in said strings and then after each record is outputted from said sorting means, the next record input to said sorting means is the smallest of any remaining records in the same string as the last said outputted record and then after the last record of said strings is input to said sorting means the next records input to said sorting means are artificial records larger than any of said records from said strings and then after the next N−1 records have been outputted from said sorting means ceasing the inputting of said artificial records.

(k) storing said string of N×N×N sorted records in a third region larger in capacity than said second region of said storage means;

(l) continuing to merge said N strings of sorted records into the next larger capacity region of said storage means whenever one of said regions of said storage means contains N strings of sorted records;

(m) repeating steps (i) through (l) until all unordered records are sorted and stored in one of said regions;

(n) merging through said sorter said strings from said regions of said storage means beginning with the smallest capacity non-empty region and continuing in increasing capacity order with each of said regions outputting said merged strings to the next largest capacity region of said storage means following the largest capacity inputting region;

(o) repeating step (n) until the total number of remaining strings in all of said regions is less than or equal to N;

(p) merging through said sorter said strings formed in step into a single ordered string.

* * * * *